United States Patent
Eom

(10) Patent No.: US 10,264,183 B2
(45) Date of Patent: Apr. 16, 2019

(54) METHOD OF UPDATING AN IMAGE AND DISPLAYING THE UPDATED IMAGE, AND ELECTRONIC DEVICE PERFORMING THE SAME

(71) Applicant: Samsung Electronics Co., Ltd., Suwon-si, Gyeonggi-do (KR)

(72) Inventor: Yu-Youl Eom, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 91 days.

(21) Appl. No.: 15/059,894

(22) Filed: Mar. 3, 2016

(65) Prior Publication Data

US 2016/0261803 A1    Sep. 8, 2016

(30) Foreign Application Priority Data

Mar. 3, 2015 (KR) .......................... 10-2015-0029811

(51) Int. Cl.
| | |
|---|---|
| *H04N 5/222* | (2006.01) |
| *H04N 5/232* | (2006.01) |
| *G06F 3/0488* | (2013.01) |
| *G06F 3/01* | (2006.01) |
| *G06F 3/0481* | (2013.01) |
| *G06F 3/041* | (2006.01) |

(52) U.S. Cl.
CPC ......... *H04N 5/23293* (2013.01); *G06F 3/016* (2013.01); *G06F 3/017* (2013.01); *G06F 3/0412* (2013.01); *G06F 3/0488* (2013.01); *G06F 3/04815* (2013.01); *H04N 5/23216* (2013.01); *G06F 2203/04101* (2013.01); *G06F 2203/04105* (2013.01); *G06F 2203/04802* (2013.01)

(58) Field of Classification Search
CPC .................................................. H04N 5/23293
USPC ..................................................... 348/333.12
See application file for complete search history.

(56) References Cited

U.S. PATENT DOCUMENTS

| | | | |
|---|---|---|---|
| 8,625,882 B2 | 1/2014 | Backlund et al. | |
| 2009/0102805 A1 | 4/2009 | Meijer et al. | |
| 2011/0050588 A1 | 3/2011 | Li et al. | |
| 2012/0113018 A1 | 5/2012 | Yan | |
| 2012/0224052 A1* | 9/2012 | Bae .................. | G01B 11/02 348/135 |
| 2012/0268420 A1* | 10/2012 | Marhefka ............ | G06F 3/038 345/174 |
| 2013/0016102 A1 | 1/2013 | Look et al. | |
| 2013/0229371 A1* | 9/2013 | Lee .................... | G06F 3/0414 345/173 |
| 2014/0043242 A1 | 2/2014 | Dietz et al. | |
| 2014/0055377 A1 | 2/2014 | Kim | |

(Continued)

FOREIGN PATENT DOCUMENTS

| | | | |
|---|---|---|---|
| EP | 2 778 856 A1 | | 9/2014 |
| EP | 2778856 | * | 9/2014 |

*Primary Examiner* — Usman A Khan
(74) *Attorney, Agent, or Firm* — Jefferson IP Law, LLP

(57) ABSTRACT

A method of displaying an image is provided. The method of displaying an image by an electronic device includes displaying an image including additional information, acquiring a user input made on the image, updating the additional information corresponding to the image and the image based on the input, and displaying the updated image according to the updated additional information.

17 Claims, 19 Drawing Sheets

(56) References Cited

U.S. PATENT DOCUMENTS

2014/0152623 A1* 6/2014 Lee .................. G06F 3/042
  345/175
2014/0354553 A1   12/2014 Dai et al.

* cited by examiner

METHOD OF UPDATING AN IMAGE AND DISPLAYING THE UPDATED IMAGE, AND ELECTRONIC DEVICE PERFORMING THE SAME

CROSS-REFERENCE TO RELATED APPLICATION(S)

This application claims the benefit under 35 U.S.C. § 119(a) of a Korean patent application filed on Mar. 3, 2015 in the Korean Intellectual Property Office and assigned Serial No. 10-2015-0029811, the entire disclosure of which is hereby incorporated by reference.

TECHNICAL FIELD

The present disclosure relates to a method of displaying an image through an electronic device.

BACKGROUND

Electronic devices such as a mobile device (for example, a mobile phone, a smart phone, or a tablet personal computer (PC)), a wearable device, and the like display an image through a touch screen and acquire a touch input, a pen input, a gesture input, and the like from a user. Further, the electronic device displays an output corresponding to the touch input, the pen input, the gesture input, or the like through a display. The electronic device may make different displays on the display of the electronic device according to a pressure of an input, even though the inputs correspond to the same command. For example, the electronic device may display the output with a different thickness or depth of the output in consideration of the pressure of the pen input. Further, the electronic device may provide a three-dimensional effect to the user by displaying a three-dimensional image as well as a two-dimensional image. Accordingly, the user may realistically recognize images displayed on the display of the electronic device.

The above information is presented as background information only to assist with an understanding of the present disclosure. No determination has been made, and no assertion is made, as to whether any of the above might be applicable as prior art with regard to the present disclosure.

SUMMARY

An electronic device may display an output corresponding to an acquired input on a display of the electronic device. However, a displayed image change according to an input cannot be reflected in the image displayed on the electronic device.

Further, the electronic device may display each image, but cannot reflect a change in one image displayed on the electronic device in another image.

Aspects of the present disclosure are to address at least the above-mentioned problems and/or disadvantages and to provide at least the advantages described below. Accordingly, an aspect of the present disclosure is to provide a method and an apparatus for displaying an image to address the above described problems or other problems.

In accordance with an aspect of the present disclosure, a method of displaying an image by an electronic device is provided. The method includes displaying an image including additional information, acquiring a user input made on the image, updating the additional information corresponding to the image and the image based on the input, and displaying the updated image according to the updated additional information.

In accordance with another aspect of the present disclosure, an electronic device is provided. The electronic device includes a display configured to display an image including additional information, and a controller configured to acquire a user input made on the image, update the additional information corresponding to the image and the image based on the input, and display the updated image on the display according to the updated additional information.

In accordance with another aspect of the present disclosure, a method of displaying an image by an electronic device is provided. The method includes displaying a first image and a second image, each of which includes additional information, a layer of the first image being higher than a layer of the second image, updating additional information corresponding to the second image based on a change in the first image, and displaying the second image according to the changed first image and the updated additional information corresponding to the second image.

In accordance with another aspect of the present disclosure, an electronic device is provided. The electronic device includes a display configured to display a first image and a second image, each of which includes additional information, a layer of the first image being higher than a layer of the second image, and a controller configured to update additional information corresponding to the second image based on a change in the first image, and display the second image on the display according to the changed first image and the updated additional information corresponding to the second image.

In accordance with another aspect of the present disclosure, a method of displaying an image by an electronic device is provided. The method includes displaying a three dimensional object, acquiring a user input, changing a shape of the three dimensional object based on a pressure of the acquired user input and displaying the changed three dimensional object.

In accordance with another aspect of the present disclosure, an electronic device is provided. The electronic device includes a display configured to display a three dimensional object, and a controller configured to acquire a user input, change a shape of the three dimensional object based on a pressure of the acquired user input, and display the changed three dimensional object on the display.

In accordance with another aspect of the present disclosure, a method of displaying an image by an electronic device is provided. The method includes updating additional information corresponding to a two dimensional image based on an acquired input, updating the two dimensional image based on the input, generating a three dimensional object by using the updated additional information and the updated two dimensional image, and displaying the three dimensional object.

In accordance with another aspect of the present disclosure, an electronic device is provided. The electronic device includes a display, and a controller configured to update additional information corresponding to a two dimensional image and the two dimensional image based on an acquired input, generate a three dimensional object by using the updated additional information and the updated two dimensional image, and display the three dimensional object on the display.

In accordance with another aspect of the present disclosure, a method of displaying an image by an electronic device is provided. The method includes updating additional information corresponding to a second two dimensional image based on a change in a first two dimensional image, a layer of the first two dimensional image being higher than a layer of the second two dimensional image, generating a first three dimensional object by using additional information corresponding to the first two dimensional image and the second two dimensional image, generating a second three dimensional object by using the second two dimensional image and the updated additional information, and displaying the first three dimensional object and the second three dimensional object.

In accordance with another aspect of the present disclosure, an electronic device is provided. The electronic device includes a display, and a controller configured to update additional information corresponding to a second two dimensional image based on a change in a first two dimensional image, a layer of the first two dimensional image being higher than a layer of the second two dimensional image, generate a first three dimensional object by using additional information corresponding to the first two dimensional image and the second two dimensional image, generate a second three dimensional object by using the second two dimensional image and the updated additional information, and display the first three dimensional object and the second three dimensional object.

According to various embodiments of the present disclosure, an electronic device can reflect a change in a displayed image according to an input and display the changed image. Further, according to various embodiments of the present disclosure, the electronic device can reflect a change in a displayed image in another displayed image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
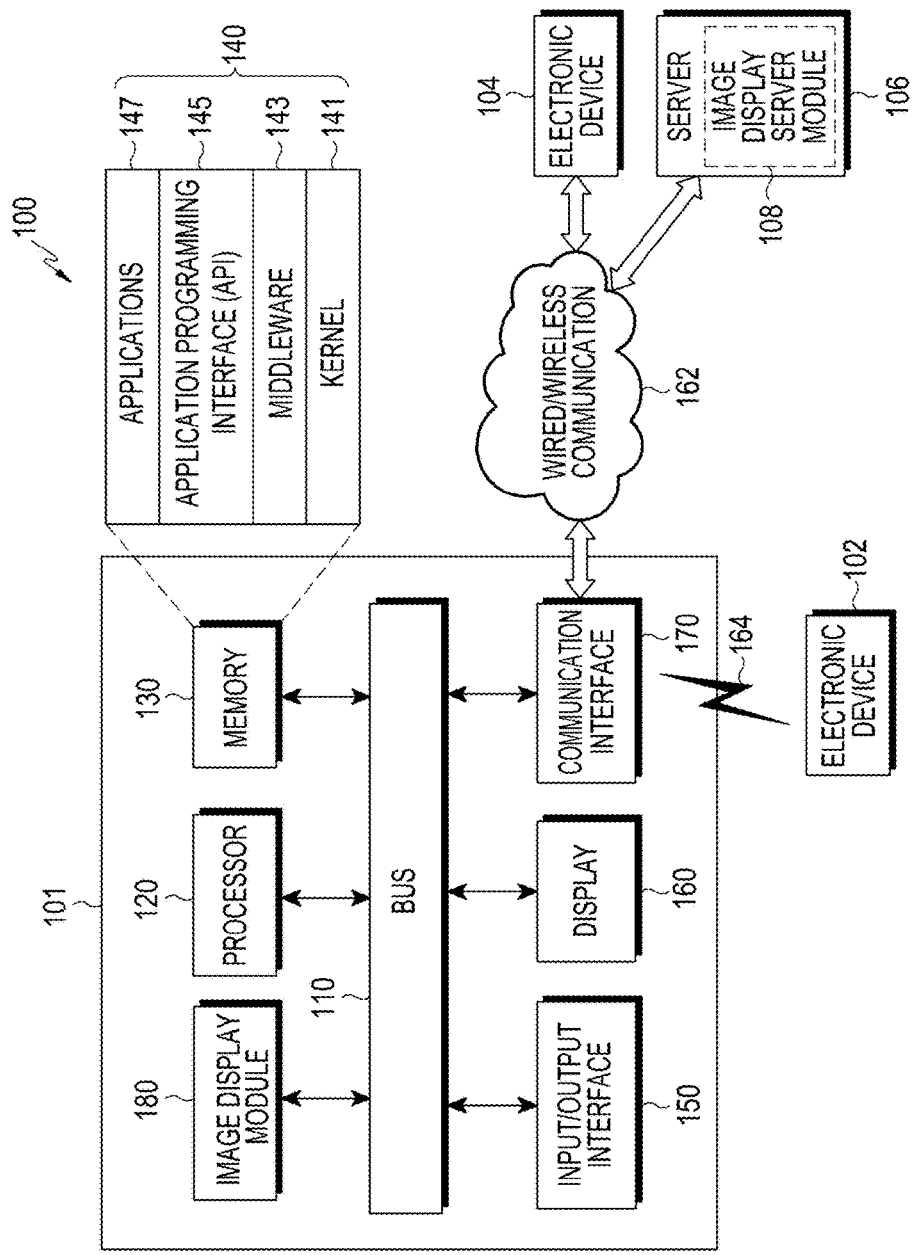
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an Moving Picture Experts Group phase 1 or phase 2 (MPEG-1 or MPEG-2) audio layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments of the present disclosure, the electronic device may be a smart home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship, a gyro-compass, etc.), avionics, security devices, an automotive head unit, a robot for home or industry, an automatic teller machine (ATM) in banks, a point of sale (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to various embodiments of the present disclosure.

Referring to FIG. 1, an electronic device 101 within a network environment 100 according to various embodiments of the present disclosure. The electronic device 101 may include a bus 110, a processor 120, a memory 130, an input/output interface 150, a display 160, a communication module 170, and an image display module 180. According to some embodiments of the present disclosure, the electronic device 101 may omit at least some of the above elements or further include other elements.

The bus 110 may include a circuit for connecting the elements 120 to 180 and transmitting communication between the elements (for example, control messages and/or data).

The processor 120 may include one or more of a central processing unit (CPU), an application processor (AP), and a communication processor (CP). The processor 120 may control, for example, one or more other elements of the electronic device 101 and/or process an operation or data related to communication. The processor 120 may be called a controller or may include a controller as a part thereof.

The memory 130 may include a volatile memory and/or a non-volatile memory. The memory 130 may store, for example, instructions or data related to at least one other element of the electronic device 101. According to an embodiment of the present disclosure, the memory 130 may store software and/or a program 140. The program 140 may include a kernel 141, middleware 143, an application programming interface (API) 145, and/or an application program (or "application") 147. At least some of the kernel 141, the middleware 143, and the API 145 may be referred to as an operating system (OS).

For example, the kernel 141 may control or manage system resources (for example, the bus 110, the processor 120, and the memory 130) which are used to execute an operation or a function implemented in the other programs (for example, the middleware 143, the API 145, and the application programs 147). Furthermore, the kernel 141 may provide an interface through which the middleware 143, the API 145, or the application program 147 may access individual elements of the electronic device 101 to control or manage system resources.

For example, the middleware 143 may serve as a relay for allowing the API 145 or the application programs 147 to communicate with the kernel 141 to exchange data. Furthermore, in regard to task requests received from the application program 147, the middleware 143 may perform a control (for example, scheduling or load balancing) for the task requests using, for example, a method of assigning at least one of the application programs 147 a priority for using the system resources (for example, the bus 110, the processor 120, or the memory 130) of the electronic device 101.

The API 145 is an interface by which the applications 147 control functions provided from the kernel 141 or the middleware 143, and may include, for example, at least one interface or function (for example, instructions) for file control, window control, image processing, or text control.

In the specification, the applications may be referred to as an application program.

The input/output interface 150 may serve as an interface which can transmit commands or data input from the user or another external device to other element(s) of the electronic device 101. Further, the input/output interface 150 may output commands or data received from another element(s) of the electronic device 101 to the user or another external device.

The display 160 may include, for example, a liquid crystal display (LCD), a light emitting diode (LED) display, an organic light emitting diode (OLED) display, a micro electro mechanical system (MEMS) display, or an electronic paper display. For example, the display 160 may display various pieces of contents (for example, text, images, videos, icons, symbols, and the like) to the user. The display 160 may include a touch screen and receive, for example, a touch input, a gesture input, a proximity input, or a hovering input using an electronic pen or a user's body part.

The communication module 170 may configure communication between, for example, the electronic device 101 and an external device (for example, a first external electronic device 102, a second external electronic device 104, or a server 106). For example, the communication module 170 may be connected to a network 162 through wireless or wired communication to communicate with the second external device (for example, the external electronic device 104 or the server 106).

The first external electronic device 102 may be, for example, a beacon. The first external electronic device 102 may transmit/receive a beacon signal 164 at a preset time interval. The first external electronic device 102 may transmit/receive the beacon signal 164 based on various communication protocols such as Bluetooth, Wi-Fi, ANT, etc.

Alternatively, the wireless communication may use, for example, at least one of long term evolution (LTE), LTE-advanced (LTE-A), code division multiple access (CDMA), wideband code division multiple access (WCDMA), universal mobile telecommunications system (UMTS), wireless broadband (WiBro), and global system for mobile communications (GSM), for example, as a cellular communication protocol. The wired communication may include, for example, at least one of a universal serial bus (USB), a high definition multimedia interface (HDMI), recommended standard 232 (RS-232), and a plain old telephone service (POTS). The network 162 may include at least one of communication networks such as a computer network (for example, a local area network (LAN) or a wireless area network (WAN)), the Internet, and a telephone network.

Each of the first and second external electronic devices 102 and 104 may be a device which is the same as or different from the electronic device 101. According to an embodiment of the present disclosure, the server 106 may include a group of one or more servers.

According to various embodiments of the present disclosure, all or some of the operations performed by the electronic device 101 may be performed by another electronic device or a plurality of electronic devices (for example, the electronic device 102 or 104 or the server 106).

According to an embodiment of the present disclosure, when the electronic device 101 should perform some functions or services automatically or by request, the electronic device 101 may make a request for performing at least some of the functions related to the functions or services to another device (for example, the electronic device 102 or 104 or the server 106) instead of performing the functions or services by itself. The other electronic device (for example, the electronic device 102 or 104 or the server 106) may carry out the requested function or the additional function and transfer the result, obtained by carrying out the function, to the electronic device 101. The electronic device 101 may provide the requested functions or services based on the received result as it is or after additionally processing the received result. To achieve this, for example, cloud computing, distributed computing, or client-server computing technology may be used.

According to an embodiment of the present disclosure, the image display module 180 may support driving of the electronic device 101 by performing at least one of the operations (or functions) implemented by the electronic device 101. For example, the server 106 may include an image display server module 108 capable of supporting the image display module 180 implemented in the electronic device 101. For example, the image display server module 108 may include one or more elements of the image display module 180 and may perform (on behalf of the image display module 180) at least one of operations of the image display module 180.

The image display module 180 may process at least some of the information obtained from other elements (for example, at least one of the processor 120, the memory 130, the input/output interface 150, and the communication module 170) and utilize the same in various manners. For example, the image display module 180 may control at least some functions of the electronic device 101 by using the processor 120 or independently thereof so that the electronic device 101 may interwork with other electronic devices (for example, the electronic device 102 or 104 or the server 106). The image display module 180 may be integrated into the processor 120 or the communication module 170. According to an embodiment of the present disclosure, at least one element of the image display module 180 may be included in the server 106 (for example, the image display server module 108) and receive at least one operation, which is performed by the image display module 180, from the server 106.

Figure 2:
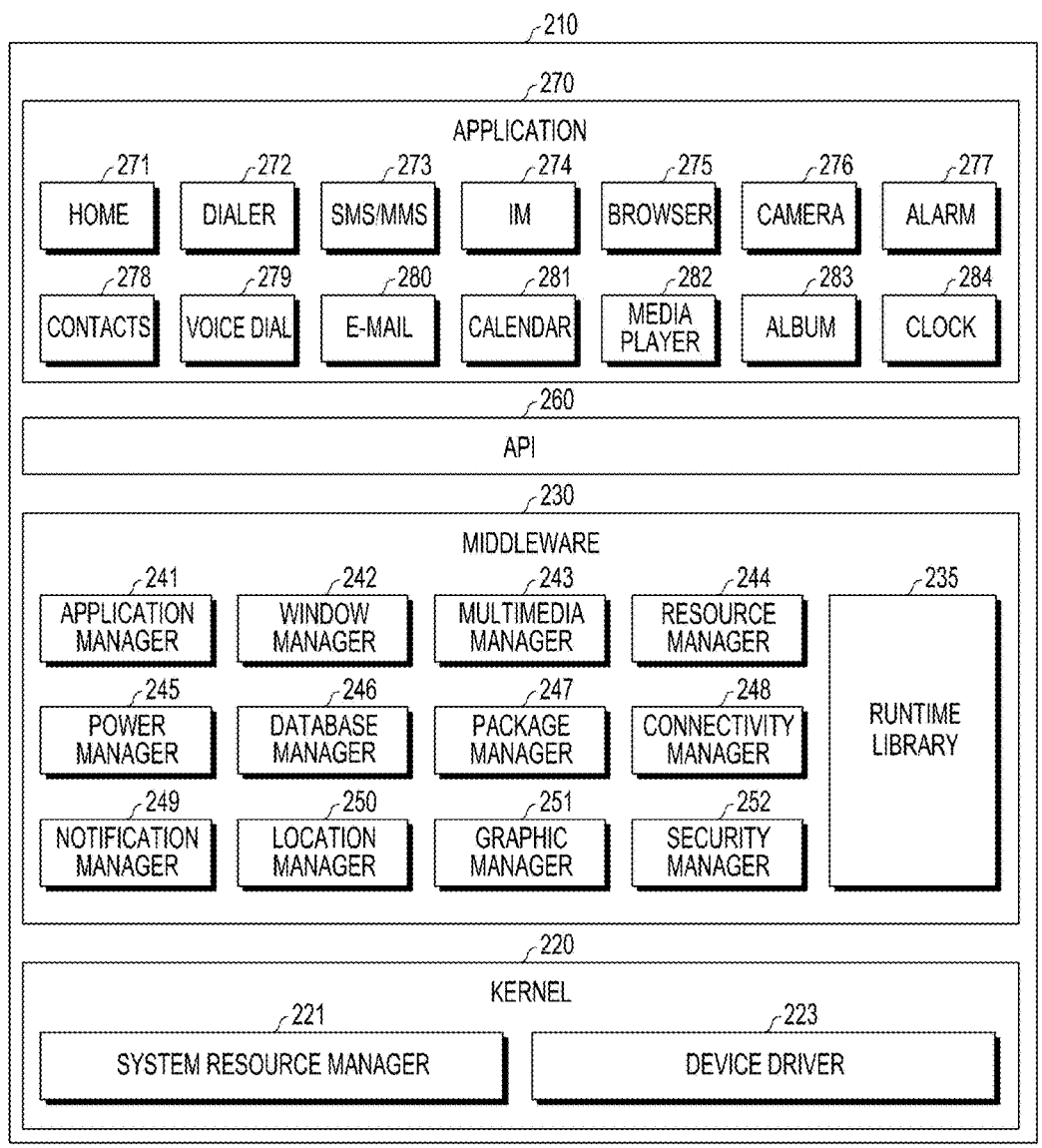
FIG. 2 is a block diagram of a program module according to various embodiments of the present disclosure.

FIG. 2 is a block diagram of a program module according to various embodiments of the present disclosure.

Referring to FIG. 2, a program module 210 (for example, the program 140) may include an OS for controlling resources related to the electronic device (for example, the electronic device 101) and/or various applications (for example, the application program 147) executed in the operating system. The operating system may be, for example, Android, iOS, Windows, Symbian, Tizen, Bada, or the like.

The program module 210 may include a kernel 220, middleware 230, an API 260, and/or applications 270. At least some of the program module 210 may be preloaded in the electronic device or downloaded in the server (for example, the server 106).

The kernel 220 (for example, the kernel 141 of FIG. 1) may include, for example, a system resource manager 221 or a device driver 223. The system resource manager 221 may control, allocate, or collect the system resources.

According to an embodiment of the present disclosure, the system resource manager 221 may include a process manager, a memory manager, or a file system manager. The device driver 223 may include, for example, a display driver, a camera driver, a Bluetooth driver, a shared-memory driver, a USB driver, a keypad driver, a Wi-Fi driver, an audio driver, or an inter-process communication (IPC) driver.

The middleware 230 may provide a function required by the applications 270 in common or provide various functions to the applications 270 through the API 260 so that the applications 270 may efficiently use limited system resources within the electronic device. According to an embodiment of the present disclosure, the middleware 230 (for example, the middleware 143) may include, for example, at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252.

The runtime library 235 may include, for example, a library module that a compiler uses in order to add new functions through a programming language while the application 270 is executed. The runtime library 235 may perform input/output management, memory management, or a function for an arithmetic function.

The application manager 241 may manage, for example, a life cycle of at least one application among the applications 270. The window manager 242 may manage a GUI resource used in a screen. The multimedia manager 243 may detect a format required for reproducing various media files and encode or decode a media file using a codec appropriate for the corresponding format. The resource manager 244 may manage resources such as a source code, a memory or a storage space of at least one application among the applications 270.

The power manager 245 may operate together with, for example, a basic input/output system (BIOS), so as to manage a battery or power and may provide power information required for the operation of the electronic device. The database manager 246 may generate, search for, or change a database to be used by at least one of the applications 270. The package manager 247 may manage the installation or updating of applications distributed in the form of a package file.

The connectivity manager 248 may manage wireless connections, for example, Wi-Fi or Bluetooth. The notification manager 249 may display or notify of an event such as a received message, an appointment, a proximity notification, and the like to a user without disturbance. The location manager 250 may manage location information of the electronic device. The graphic manager 251 may manage graphic effects to be provided to a user and user interfaces related to the graphic effects. The security manager 252 may provide various security functions required for system security or user authentication. According to an embodiment of the present disclosure, when the electronic device (for example, electronic device 101) has a call function, the middleware 230 may further include a telephony manager for managing a voice call function or a video call function of the electronic device.

The middleware 230 may include a middleware module for forming a combination of various functions of the aforementioned elements. The middleware 230 may provide a module specialized for each type of operating system in order to provide a differentiated function. In addition, a few existing elements may be dynamically removed from the middleware 230, or new elements may be added to the middleware 230.

The API 260 (for example, the API 145), which is a set of API programming functions, may be provided in a different configuration for each operating system. For example, in the case of Android or iOS, one API set may be provided for each platform. In the case of Tizen, two or more API sets may be provided for each platform.

The applications 270 (for example, the applications 147) may include one or more of a home application 271, a dialer application 272, an short message service (SMS)/multimedia messaging service (MMS) application 273, an instant message (IM) application 274, a browser application 275, a camera application 276, an alarm application 277, a contact information application 278, a voice dial application 279, and e-mail application 280, a calendar application 281, a media player application 282, an album application 283, a clock application 284, a health care application (for example, an application for measuring an amount of exercise or blood sugar), and an environmental information application (for example, an application for providing atmospheric pressure, humidity, or temperature information).

According to an embodiment of the present disclosure, the applications 270 may include an application (hereinafter, referred to as an "information exchange application" for convenience of description) supporting information exchange between the electronic device (for example, the electronic device 101) and an external electronic device (for example, the electronic device 102 or 104). The information exchange application may include, for example, a notification relay application for transmitting predetermined information to the external electronic device, or a device management application for managing the external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, an external electronic device and provide the received notification information to a user. The device management application may manage (for example, install, delete, or update), for example, a function for at least a part of the external electronic device (for example, the electronic device 102 or 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment of the present disclosure, the applications 270 may include an application (for example, health management application) designated according to attributes (for example, attributes of the electronic device such as the type of electronic device which corresponds to a mobile medical device) of the external electronic device (for example, the electronic device 102 or 104).

According to an embodiment of the present disclosure, the applications 270 may include an application received from the external electronic device (for example, the server 106, or the electronic device 102 or 104).

According to an embodiment of the present disclosure, the applications 270 may include a preloaded application or a third party application which can be downloaded from the server. Names of the elements of the program module 210, according to the above-described embodiments of the present disclosure, may change depending on the type of OS.

According to various embodiments of the present disclosure, at least some of the program module 210 may be implemented in software, firmware, hardware, or a combination of two or more thereof. At least some of the programming module 210 may be implemented (for example, executed) by, for example, the processor (for example, the AP 210). At least some of the programming module 210 may include, for example, a module, program, routine, sets of instructions, operation, or the like for performing one or more functions.

Figure 3:
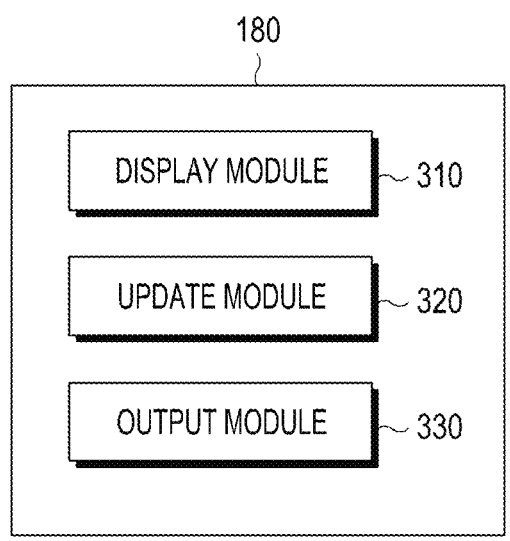
FIG. 3 is a block diagram of an image display module of an electronic device according to various embodiments of the present disclosure.

FIG. 3 is a block diagram of an image display module of an electronic device according to various embodiments of the present disclosure.

Referring to FIG. 3, the image display module 180 may include at least some or all of a display module 310, an update module 320, and an output module 330. The image display module 180 may be provided separately from the processor (for example, the processor 120) or may be entirely or partially integrated into the processor.

The display module 310 according to various embodiments of the present disclosure may display an image including additional information on a display (for example, the display 160) of the electronic device 101. The display may include a touch screen which may acquire a touch input or the like. Further, the display module 310 may display a plurality of images including additional information. The display module 310 may display the plurality of images on the display such that the plurality of images overlap with each other according to each piece of additional information based on a layer of each image. The display module 310 may display the images in three dimensions by displaying the images on the display according to the additional information.

According to an embodiment of the present disclosure, the additional information may include at least one piece of depth information and height information. The additional information may be included in a data format of the image. For example, the additional information may be included in pixel data of the image or in a data header region or an Exif region of the image. The height information may be information on each pixel value for expressing a height of at least one object included in the image, and the depth information may be information on each pixel value for expressing a depth of at least one object included in the image. Further, in addition to the additional information, the data format of the image may further include at least one piece of texture information on the image, reflectance information preset according to the texture information, and blur effect information preset according to the texture information and an input attribute of the user.

The electronic device 101 may acquire the user's input made on the image displayed on the display through an input/output interface (for example, the input/output interface 150). The user's input may include a touch input, a pen input, a gesture input, and the like. The electronic device 101 may configure attributes according to the acquired user's input. For example, the attributes of the input may be configured such that each attribute is reflected according to a writing instrument or a drawing tool such as a pen, a pencil, a highlighter, a crayon, and a brush.

The display module 310 may apply at least one piece of the texture information, the reflectance information, and the blur effect information as well as the additional information to the image. Accordingly, the electronic device 101 may realistically display the image.

Further, the display module 310 may apply a shadow effect to the image. The display module 310 may apply at least one of a shadow effect based on a location of a light source acquired through an illumination sensor or the like included in the electronic device 101, a shadow effect based on a location of a view acquired through a camera included in the electronic device 101, and a shadow effect according to a movement of the electronic device to the image. In order to apply the shadow effect to the image, the display module 310 may acquire information on the light source acquired by another external device and the acquired view from the other electronic device. As described above, the display module 310 may use the information acquired from another external device to apply the shadow effect. Further, according to an embodiment of the present disclosure, when a light source is not sensed, the display module 310 may apply a shadow effect based on a virtual light source to the image.

The update module 320 according to various embodiments of the present disclosure may update additional information corresponding to the image and the image based on the acquired user input. The display module 310 may display the updated image according to the updated additional information on the display. The additional information corresponds to information on each pixel value for expressing at least one of a height and a depth of an object included in the image, and the image displayed on the display may be changed according to the additional information.

By updating the additional information based on an acquired input, the display module 310 may change the image displayed on the display according to the input and display the changed image. Further, by updating the image based on the acquired input, the display module 310 may display the updated image, to which an output corresponding to the input is reflected, on the display.

According to an embodiment of the present disclosure, at least one of the additional information and the image may not be updated. However, when at least one of the additional information and the image is updated, the image displayed on the display may be changed. When only the additional information is updated, the display module 310 may display the image according to the updated additional information on the display. Further, when only the image is updated, the display module 310 may display the updated image according to the additional information.

According to an embodiment of the present disclosure, the update module 320 may sense a pressure of the acquired input and acquire the sensed pressure of the input. Based on a location of the input, the update module 320 may update the additional information corresponding to the image to additional information controlled according to the sensed pressure. As described above, the update module 320 may update the additional information such that the image is expressed with a different height or depth according to the pressure of the input. A reference for controlling the additional information according to the pressure of the input may be configured in advance and a method thereof will be described below.

According to an embodiment of the present disclosure, the update module 320 may measure a change in a distance between the input and the electronic device 101 and acquire the measured distance change. Based on the location of the input, the update module 320 may update the additional information corresponding to the image to additional information controlled according to the distance change. A reference for controlling the additional information according to the distance change may be configured in advance and a method thereof will be described below.

Further, the update module 320 may update additional information corresponding to a lower layer image based on a change in a higher layer image. The display module 310 may display the lower layer image according to the changed higher layer image and the updated additional information corresponding to the lower layer image. By updating the additional information corresponding to the lower layer image based on the change in the higher layer image, the display module 310 may change the lower layer image displayed on the display according to the change in the higher layer image and display the changed image.

According to an embodiment of the present disclosure, the update module 320 may determine an area in which the changed higher layer image and the lower layer image overlap and acquire information on the determined area in which the images overlap. The update module 320 may update additional information corresponding to the lower layer image based on the area in which the images overlap. The update module 320 may update the additional information corresponding to the lower layer image to additional information controlled according to the additional information corresponding to the higher layer image. A reference of the additional information controlled according to the additional information corresponding to the higher layer image may be configured in advance and a method thereof will be described below. As described above, by using the fact that the higher layer image is overlappingly displayed on the lower layer image, the update module 320 may update the additional information corresponding to the lower layer image in the area in which the images overlap.

According to an embodiment of the present disclosure, the output module 330 may output a vibration based on a difference between the additional information corresponding to the image and the updated additional information. A strength of the output vibration may be configured in advance according to the difference. For example, as the difference increases, the strength of the output vibration may also increase.

According to an embodiment of the present disclosure, the output module 330 may output a sound configured based on the preset attributes of the input and the texture information through a speaker. For example, the input may be a pen input and the attributes of the pen input may be a pencil. Further, when the texture information of the image corresponds to a paper material, the output module 330 may output a sound generated when writing is made on paper with a pencil through the speaker.

Figure 4:
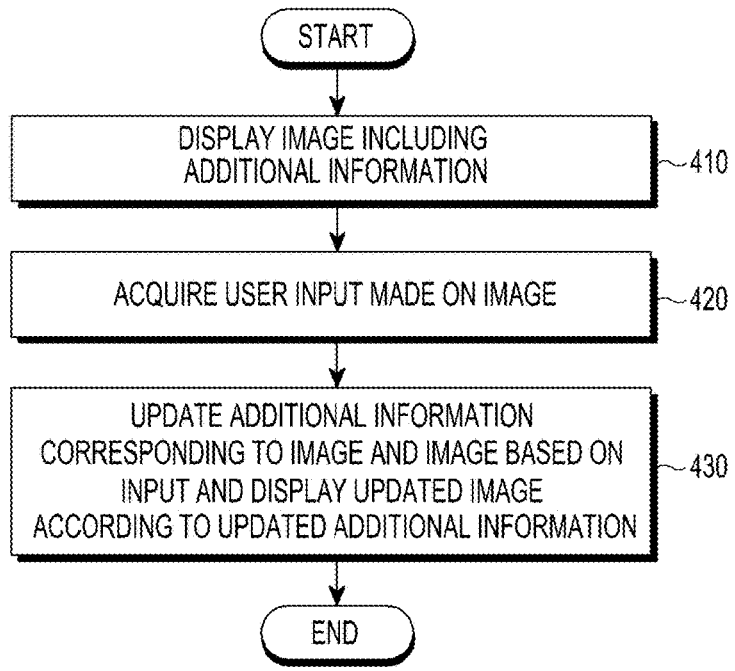
FIG. 4 is a flowchart illustrating an image display method according to an embodiment of the present disclosure.

FIG. 4 is a flowchart illustrating an image display method according to an embodiment of the present disclosure.

Referring to FIG. 4, the electronic device 101 may display an image including additional information in operation 410. The additional information may include at least one piece of depth information and height information. The electronic device 101 may display the image in three dimensions by displaying the image on the display according to the additional information.

In operation 420, the electronic device 101 may acquire a user input made on the image displayed on the display. The electronic device 101 may acquire the user input through an input/output interface. The user input may include a touch input, a pen input, a gesture input, and the like. The electronic device 101 may configure attributes according to the acquired user input.

In operation 430, the electronic device 101 may update additional information corresponding to the image and the image based on the input. Further, the electronic device 101 may display the updated image according to the updated additional information. The height information is information on each pixel value for expressing heights of objects included in the image and the depth information is information on each pixel value for expressing depths of the objects included in the image, so that the image displayed on the display may be changed according to the update of the additional information. Accordingly, by updating the additional information based on the input, the electronic device 101 may change the image according to the input and display the changed image. Further, by updating the image based on the acquired input, the electronic device 101 may reflect an output corresponding to the input to the image and display the image on the display.

Figure 5:
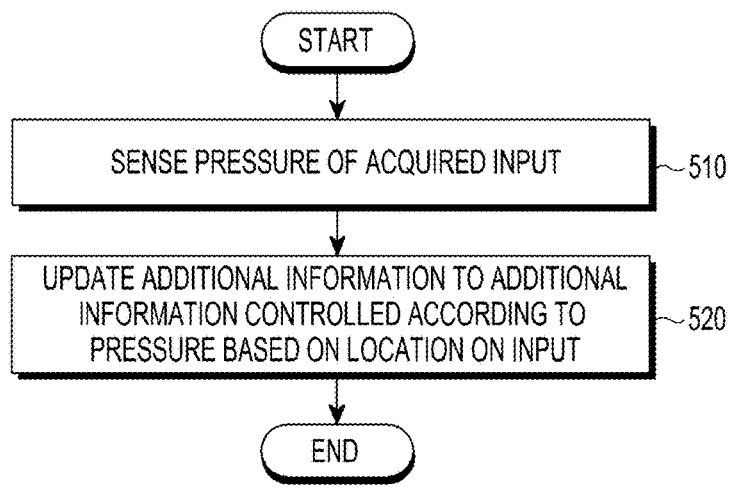
FIG. 5 is a flowchart illustrating an additional information update process according to an embodiment of the present disclosure.

FIG. 5 is a flowchart illustrating an additional information update process according to an embodiment of the present disclosure.

Referring to FIG. 5, the electronic device 101 may sense a pressure of an acquired input in operation 510. When the input corresponds to a pen input or a touch input, the electronic device 101 may acquire the input through the touch screen and sense the pressure of the input.

In operation 520, the electronic device 101 may update the additional information corresponding to the image to additional information controlled according to a strength of the pressure based on a location of the input. A reference for controlling the additional information according to the sensed pressure of the input may be configured in advance. For example, the reference for controlling the additional information may be configured in advance such that, as the strength of the pressure of the input sensed by the electronic device 101 increases, the additional information is further controlled.

As described above, by updating the additional information according to the pressure of the input, the electronic device 101 may display the image on the display differentially according to the pressure of the input. By displaying the image on the display differentially according to the pressure of the input, the electronic device 101 may display the changed image on the display according to the input.

FIGS. 6A to 6D illustrate a display of an electronic device according to an embodiment of the present disclosure.

Referring to FIGS. 6A to 6D, the electronic device 101 displays an image corresponding to paper on the display according to additional information included in the image. The additional information may be configured in consideration of a material characteristic according to the type of paper indicted by the image. For example, Tant paper as has a material characteristic of having a non-uniform thickness through partial embossing processing unlike general vellum paper having a uniform thickness. In consideration of the material characteristic of the Tant paper, additional information included in the image may be configured. The configured additional information may be included in a data format of the image. As described above, the electronic device 101 may reflect the material characteristic of the Tant paper and display the image on the display in three dimensions based on the additional information configured according to the material characteristic of the Tant paper.

Further, the data format of the image may further include texture information on the image, reflectance information preset according to the texture information, and blur effect information preset according to the texture information and an attribute of the input. For example, when the image corresponds to an image indicating Hanji (traditional Korean paper), the data format of the image may further include at least one piece of texture information including information on a texture of Hanji, reflectance information indicating a reflectance of Hanji, and blur effect information preset according to Hanji and the attribute of the input. The electronic device 101 may apply at least one piece of the texture information, the reflectance information, and the blur effect information to the image.

Figure 6A:
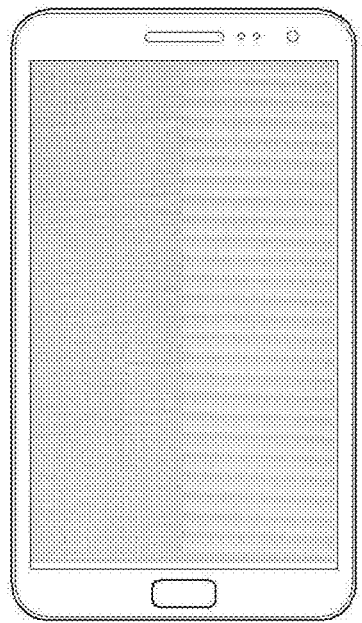
FIGS. 6A to 6D illustrate a display of an electronic device according to an embodiment of the present disclosure.

In FIG. 6A, the electronic device 101 displays checked/striped Leathack paper. The checked Leathack paper corresponds to paper that is embossing-processed with checked shapes, and the striped Leathack paper corresponds to paper that is embossing-processed with horizontal or vertical stripes. Both the checked and striped Leathack paper have a material characteristic of having a non-uniform thickness of the paper due to the embossing processing unlike wood free paper. For example, the part that is embossing-processed is thick and the part that is not embossing-processed is thin. In consideration of the material characteristic of the checked/striped Leathack paper, additional information corresponding to the image indicating the checked/striped Leathack paper may be configured. The electronic device 101 may display the image indicating the checked/striped Leathack paper on the display according to the configured additional information. Accordingly, the electronic device 101 may display the image indicating the checked/striped Leathack paper in three dimensions.

Figure 6B:
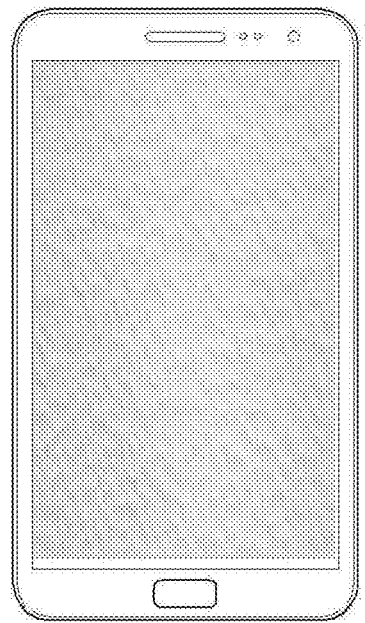

In FIG. 6B, the electronic device 101 displays Tant paper. As described above, the Tant paper corresponds to the partially embossing-processed paper, and has the material characteristic of having a non-uniform thickness due to the embossing processing. As described above, the additional information corresponding to the image indicating the Tant paper may be configured in consideration of the material characteristic of the Tant paper. The electronic device 101 may display the image indicating the Tant paper on the display according to the configured additional information. Accordingly, the electronic device 101 may display the image indicating the Tant paper in three dimensions.

Figure 6C:
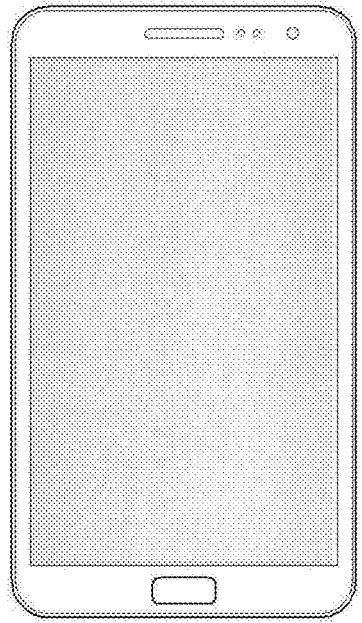

In FIG. 6C, the electronic device 101 displays paper of a shiny material. The paper of the shiny material has a uniform thickness but non-uniform reflectance of light. In this case, additional information corresponding to the image indicating the paper of the shiny material may be uniformly configured but reflectance information may not be uniformly configured. The electronic device 101 may display the image indicating the paper of the shiny material on the display according to the uniformly configured additional information. Further, the electronic device 101 may apply the reflectance information corresponding to the image indicating the paper of the shiny material in a process of displaying the image. Accordingly, the electronic device 101 may apply the non-uniform reflectance characteristic of the paper of the shiny material to the image and display the image on the display. Therefore, the electronic device 101 may display the image indicating the paper of the shiny material on the display in three dimensions.

Figure 6D:
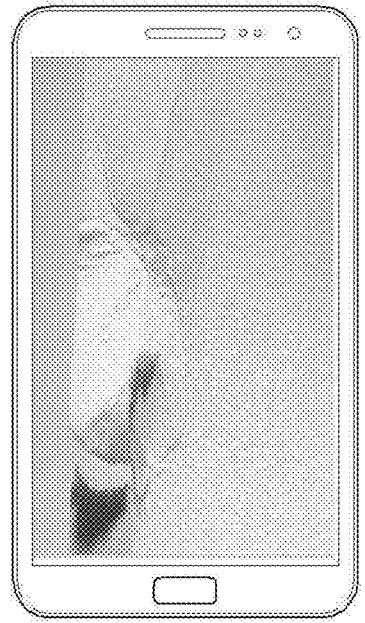

In FIG. 6D, the electronic device 101 displays crumpled paper. When paper is crumpled, a height of the crumpled part of the paper and a height of another part may be different as illustrated in FIG. 6D. Additional information on the image indicating the crumpled paper may be configured such that height information included in the additional information corresponding to the crumpled part of the paper is distinguished from height information included in the additional information corresponding to the other part. The electronic device 101 may display the image indicating the crumpled paper on the display according to the configured height information. Accordingly, the electronic device 101 may display the crumpled paper on the display in three dimensions.

As described above, the electronic device 101 may display the image on the display according to the additional information corresponding to the image. Although it has been described that the electronic device 101 displays the images indicating the paper in FIGS. 6A to 6D, the present disclosure is not limited thereto. The electronic device 101 may also display another image including additional information such as height information, depth information, and the like on the display according to the additional information corresponding to the other image.

Figure 7A:
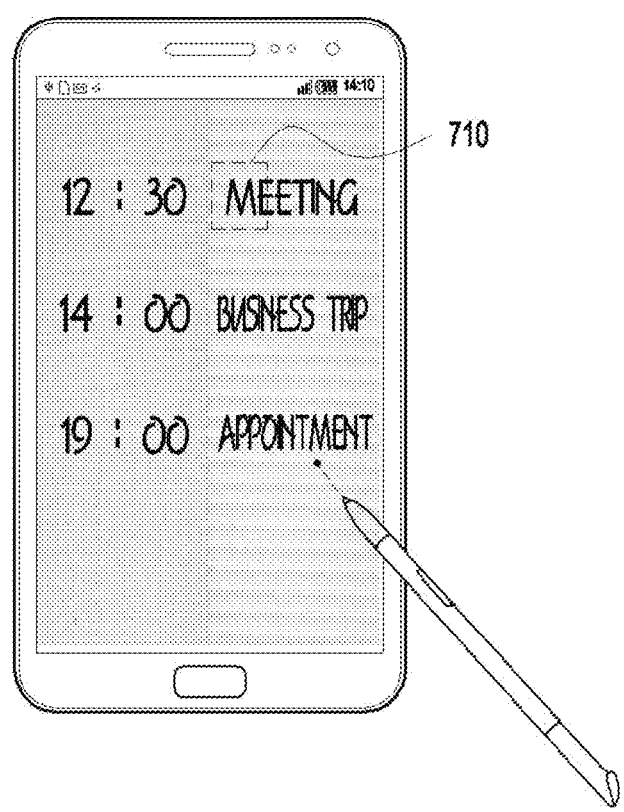
FIG. 7A illustrates an electronic device that displays an updated image according to updated additional information based on an input according to an embodiment of the present disclosure.

FIG. 7A illustrates an electronic device that displays an updated image according to updated additional information based on an input according to an embodiment of the present disclosure.

Referring to FIG. 7A, the electronic device 101 may display the image on the display according to additional information corresponding to the image indicating the checked/striped Leathack paper. The electronic device 101 may acquire a user input made on the displayed image in a state where the image is displayed on the display according to the additional information corresponding to the image indicating the checked/striped Leathack paper. The electronic device 101 may update the additional information corresponding to the image and the image based on the acquired input. The additional information may have a different reference for controlling the additional information according to pressure of the input. This will be described below with reference to FIG. 7B.

Further, by updating the image based on the input, the electronic device 101 may display the updated image in which an output corresponding to the input is reflected on the display. For example, like a part 710, a character "M" corresponding to a user input made on the image may be reflected in the image. Accordingly, the electronic device 101 may display the updated image generated by reflecting the character "M" to the image on the display.

The electronic device 101 may display the updated image on the display according to the updated additional information based on the input. Accordingly, the electronic device 101 may reflect the change in the image of the displayed striped Leathack paper based on the input and display the image on the display.

Figure 7B:
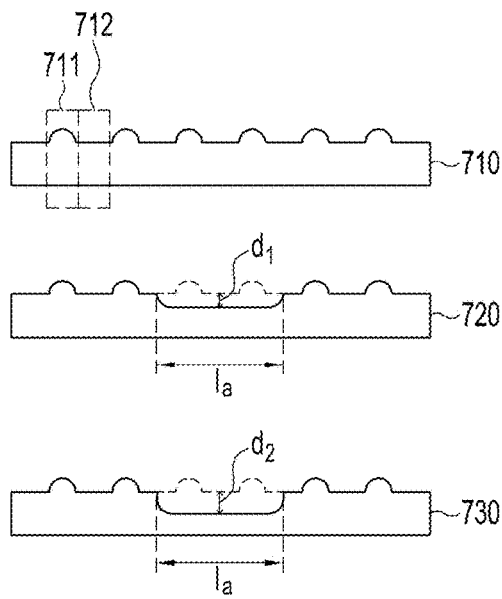
FIG. 7B is a virtual cross-sectional view of an updated image displayed through an electronic device according to an embodiment of the present disclosure.

FIG. 7B is a virtual cross-sectional view of the updated image displayed through the electronic device according to an embodiment of the present disclosure.

Referring to FIG. 7B, virtual cross-sectional views 710, 720, and 730 of the updated image displayed through the electronic device 101 are illustrated. The virtual cross-sectional views 710, 720, and 730 correspond to virtual cross-sectional views for describing a reference based on height information or depth information in the additional information that is controlled according to pressure of a user input.

The virtual cross-sectional view 710 corresponds to a virtual cross-sectional view of the image displayed according to height information or depth information corresponding to the image indicating the striped Leathack paper when the input is not acquired. The height information may be configured such that an embossing-processed part 711 is higher than a non-embossing-processed part 712 based on the material characteristic of the striped Leathack paper. Similarly, the depth information may be also configured such that the embossing-processed part 711 is distinguished from the non-embossing-processed part 712 based on reflection of characteristics of the parts 711 and 712. Accordingly, the electronic device 101 may make the embossing-processed part 711 distinguished from the non-embossing-processed part 712.

The virtual cross-sectional view 720 corresponds to a virtual cross-sectional view of the updated image displayed according to updated additional information based on the pressure of the input when the input is acquired. For example, the electronic device 101 may sense the pressure of the input and update the height information or depth information on the image corresponding to a part (Ia) in which the input is acquired, according to a preset reference based on the sensed pressure. The height information corresponding to the part (Ia) in which the input is acquired may be controlled such that the height is reduced by d from the non-embossing-processed part. The height information may be controlled such that the height of the embossing-processed part becomes the same as a height of the non-embossing-processed part. Further, although not illustrated, the height information may be controlled such that the height of the embossing-processed part becomes higher than the height of the non-embossing-processed part. As described above, the reference for controlling the height information may be variously preset. Similarly, the depth information may also be variously controlled and updated according to the pressure of the input.

The electronic device 101 may update the height information corresponding to the part (Ia) in which the input is acquired to the controlled height information and update the image corresponding to the part (Ia) in which the input is acquired. Further, the electronic device 101 may update the depth information corresponding to the part (Ia) in which the input is acquired to the controlled depth information. In this case, the electronic device 101 may display the cross-sectional view 720 such that the height of the part (Ia) in which the input is acquired is distinguished from the height of the part in which the input is not acquired. Further, an output corresponding to the input may be reflected in the part (Ia) in which the input is acquired and then displayed on the display.

The virtual cross-sectional view 730 also corresponds to a virtual cross-sectional view of the updated image displayed according to updated height information or depth information based on the pressure of the input when the input is acquired. For example, the electronic device 101 may sense the pressure of the input and update the height information or depth information on the image corresponding to a part (Ia) in which the input is acquired, according to a preset reference based on the sensed pressure. For example, the height information corresponding to the part (Ia) in which the input is acquired may be controlled such that the height is reduced by d from the non-embossing-processed part. The height information may be controlled such that the height of the embossing-processed part becomes the same as a height of the non-embossing-processed part. Further, although not illustrated, the height information may be controlled such that the height of the embossing-processed part becomes higher than the height of the non-embossing-processed part. As described above, the reference for controlling the height information may be variously preset.

For example, when a strength of the pressure sensed in the cross-sectional view 730 is stronger than that of the pressure sensed in the cross-sectional view 720, d indicating the reduced height in the cross-sectional view 730 may be larger than d indicating the reduced height in the cross-sectional view 720. As described above, as the strength of the sensed pressure increases, the height information may be further controlled. Similarly, the depth information may be also variously controlled and updated according to the pressure of the input. This is to reflect an effect in which, when the user takes notes in practical life, as the user applies more power to a pen to take notes on paper, the paper is further pressed. The height or depth reduced and displayed according to the strength of the sensed pressure may be configured in advance.

As described in FIGS. 7A and 7B, the electronic device 101 may update the additional information according to the pressure of the input acquired for the image including the additional information.

Figure 8:
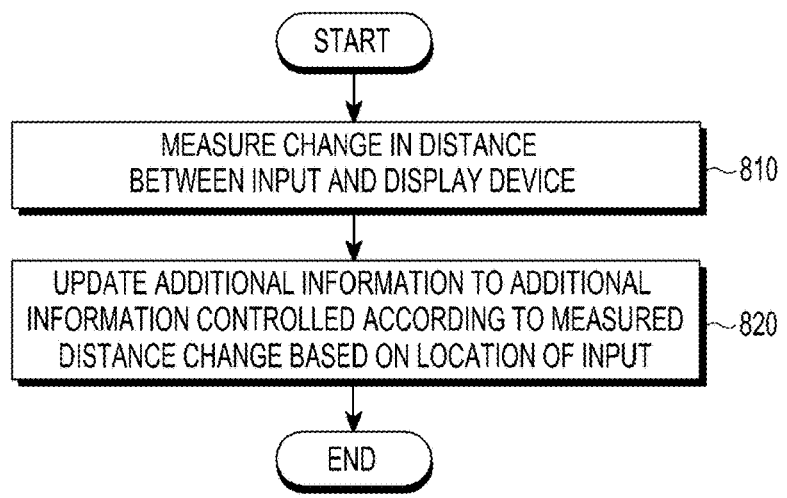
FIG. 8 is a flowchart illustrating an additional information update process according to an embodiment of the present disclosure.

FIG. 8 is a flowchart illustrating an additional information update process according to an embodiment of the present disclosure.

Referring to FIG. 8, the electronic device 101 may measure a change in a distance between an acquired input and the electronic device 101 in operation 810. When the input is a gesture input, the electronic device 101 may sense a shape of the gesture input and a direction in which the gesture input faces. The electronic device 101 may measure a change in a distance between the gesture input and the electronic device in consideration of a position at which the gesture input starts and a position at which the gesture input stops after the movement in the direction in which the gesture input faces.

In operation 820, the electronic device 101 may update the additional information corresponding to the image to additional information controlled according to the measured distance change based on the location of the input. A reference for controlling the additional information according to the measured distance change may be configured in advance. For example, the reference may be configured in advance such that as the measured distance change increases, the additional information is further controlled.

As described above, by updating the additional information according to the measured distance change, the electronic device 101 may display the image on the display differentially according to the measured distance change. By displaying the image on the display differentially according to the measured distance change, the electronic device 101 may display the changed image on the display based on the input.

Figure 9A:
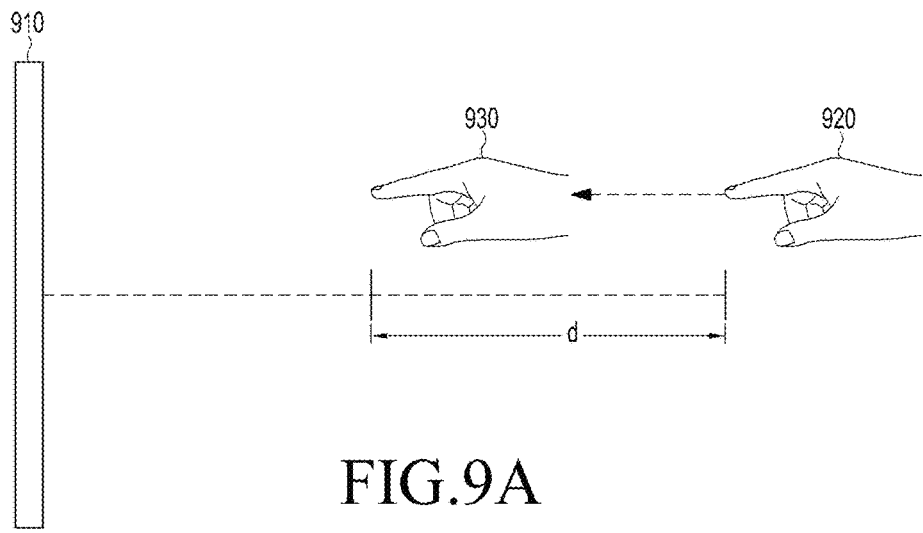
FIG. 9A is a conceptual diagram illustrating a change in a distance between an input and an electronic device according to an embodiment of the present disclosure.

FIG. 9A is a conceptual diagram illustrating a change in a distance between an input and an electronic device according to an embodiment of the present disclosure.

Referring to FIG. 9A, when an acquired input is a gesture input, a distance change (d) between the gesture input and the electronic device 910 may be measured. The electronic device 101 may measure a position 920 at which the gesture input starts and a position 930 at which the gesture input stops after movement in a direction in which the gesture input faces. The electronic device 101 may measure the distance change (d) between the gesture input and the electronic device 101 by using the position 920 at which the gesture input starts and the position 930 at which the gesture input stops.

Figure 9B:
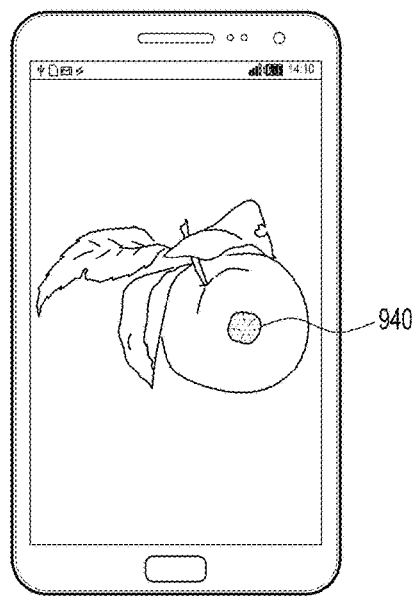
FIG. 9B illustrates an electronic device that displays an updated image according to a measured distance change according to an embodiment of the present disclosure.

FIG. 9B illustrates an electronic device that displays an updated image according to the measured distance change according to an embodiment of the present disclosure.

Referring to FIG. 9B, the electronic device 101 may display the updated image according to updated additional information based on the measured distance change on the display. The electronic device 101 may update the additional information on the image in a part 940 corresponding to the gesture input to the additional information controlled according to the measured distance change (d). For example, the electronic device 101 may control height information such that a height of the part 940 corresponding to the gesture input is lower than a height of the other parts except for the part 940 corresponding to the gesture input. Further, the electronic device 101 may control the height information such that as the measured distance change (d) increases, the height of the part 940 corresponding to the gesture input becomes lower.

Similarly, the electronic device 101 may control depth information such that a depth of the part 940 corresponding to the gesture input is deeper than a depth of the other parts except for the part 940 corresponding to the gesture input according to the measured distance change (d). Further, the electronic device 101 may control the depth information such that as the measured distance change (d) increases, the depth of the part 940 corresponding to the gesture input becomes deeper.

Further, by updating the image based on the gesture input, the electronic device 101 may display the updated image generated by reflecting an output corresponding to the input to the image on the display. For example, the output corresponding to the gesture input may be reflected in the image by darkly displaying the part 940 corresponding to the gesture input.

According to an embodiment of the present disclosure, the electronic device 101 may darkly display the part 940 corresponding to the gesture input as if the part 940 is deeper than the other parts in an image indicating an apple illustrated in FIG. 9B. Accordingly, the electronic device 101 may display, on the display, the changed image based on the gesture input.

Figure 10:
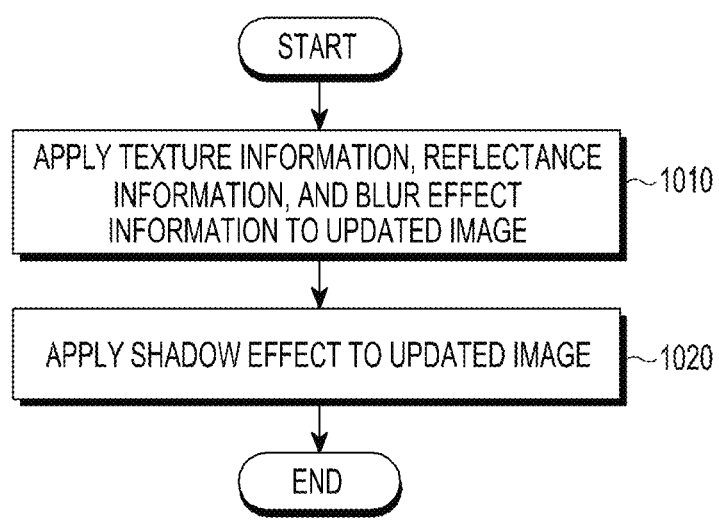
FIG. 10 is a flowchart illustrating a process of displaying an updated image according to an embodiment of the present disclosure.

FIG. 10 is a flowchart illustrating a process of displaying an updated image according to an embodiment of the present disclosure.

Referring to FIG. 10, the electronic device 101 may apply at least one piece of the texture information, the reflectance information, and the blur effect information included in the data format of the image to the image in operation 1010. The texture information may vary depending on the image and may be included in the data format of the image. For example, when the image is a paper image, the texture information may be information on a texture of the paper indicated by the image. Further, when the image is a photo image, the texture information may be information on a texture of photographic paper. As described above, the texture information may be differently configured based on a preset reference according to an attribute of the image and may be configured as a texture which the user desires in the process of generating the image and included in the data format of the image.

The reflectance information and the blur effect information may be associated with the texture information. The reflectance information may be information including a reflectance of the texture indicated by the texture information. The reflectance may be configured in advance in consideration of a characteristic of the texture indicated by the texture information.

The blur effect information may be information including a blur degree based on an absorption force of the texture indicated by the texture information. The blur degree may vary depending on the attribute of the input. The attribute of the input may be configured such that each attribute is reflected according to a writing instrument or a drawing tool such as a pen, a pencil, a highlighter, a crayon, a brush, etc. Even through a writing or a drawing is made on the same material paper, the blur effect created on the paper may be different according to the attribute of the writing tool or the drawing tool.

For example, when the texture information indicates information on a Hanji texture, a blur degree included in blur effect information on Hanji may vary depending on the attribute of the input. For example, when the attribute of the input is a pen, the blur degree may be configured to be lower, compared to a case where the attribute of the input is a brush. Further, based on a characteristic that wood free paper has a lower absorption force compared to Hanji, the blur degree of the Hanji included in the blur effect information may be configured to be lower, compared to that of the wood free paper.

However, when the attribute of the input is a pencil, the pencil has an attribute of having a very low blur degree. Accordingly, a blur degree in a case where the texture corresponds to the wood free paper and the attribute of the input corresponds to the pencil may be configured to be similar to the blur degree in a case where the texture corresponds to the Hanji and the attribute of the input corresponds to the brush. Accordingly, the blur degree may be configured in consideration of the texture information and the attribute of the input.

The reflectance information and the blur effect information may be included in the texture information or may be separately configured and included in the data format of the image.

The electronic device 101 may apply the texture information, the reflectance information, and the blur effect information to the updated image. Accordingly, the electronic device 101 may display the updated image, to which the texture information, the reflectance information, and the blur effect information are applied, on the display.

In operation 1020, the electronic device 101 may apply a shadow effect to the updated image. The electronic device 101 may apply the shadow effect to the updated image and display the image according to a location of the light source, an angle at which the user views the display or movement of the electronic device 101. Further, when a light source is not sensed, the electronic device 101 may apply the shadow effect based on a virtual light source to the image and display the image. The electronic device 101 may generate the virtual light source and apply the shadow effect to the image even when the light source is not sensed. The virtual light source may be randomly generated by the electronic device 101 or generated by the electronic device 101 according to a user input. Accordingly, the electronic device 101 may display the updated image further in three dimensions.

Orders of operations 1010 and 1020 may be changed and may be sequentially or simultaneously performed. Further, in the process of displaying the updated image, operations 1010 and 1020 may be selectively applied.

Figure 11A:
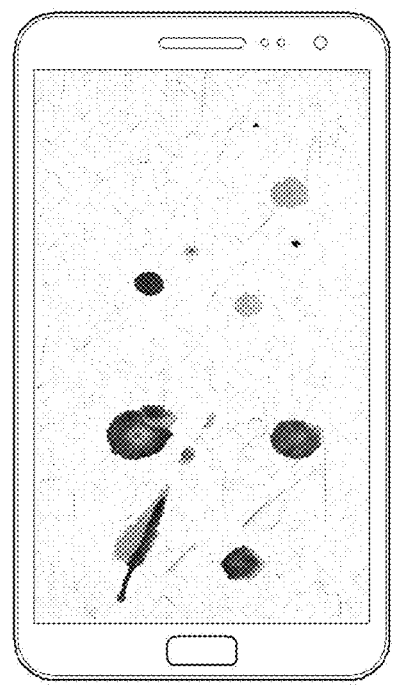
FIGS. 11A and 11B illustrate an electronic device that displays an updated image to which texture information, reflectance information, and blur effect information are applied according to an embodiment of the present disclosure.
Figure 11B:
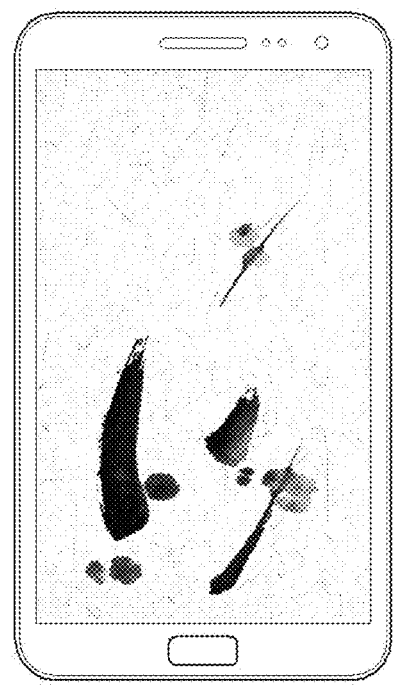

FIGS. 11A and 11B illustrate an electronic device that displays an updated image to which texture information, reflectance information, and blur effect information are applied according to an embodiment of the present disclosure.

Referring to FIGS. 11A and 11B, the electronic device displays the updated image to which at least one piece of the texture information, the reflectance information, and the blur effect information is applied when the texture information on the image corresponds to Hanji and the attribute of the input corresponds to the brush.

A blur degree included in the blur effect information configured in association with the texture information on the Hanji may vary depending on the attribute of the input.

As illustrated in FIG. 11A, the electronic device 101 may apply the blur effect information to the updated image and display the image in order to reflect the blur degree configured according to the brush corresponding to the attribute of the input. Accordingly, the electronic device 101 may apply the blur effect to an output corresponding to the brush input as if the actual brush input is displayed on the Hanji and display the updated image on the display.

Further, according to an embodiment of the present disclosure, the electronic device 101 may reflect pressure of the input according to the attribute of the input as illustrated in FIG. 11B. For example, the electronic device 101 may display an output corresponding to the input of the attribute of the brush to be split according to pressure of the input as if the brush is actually used. For example, an edge part of the brush input may be displayed to be split since a strength of the pressure of the edge part is weak.

Figure 12A:
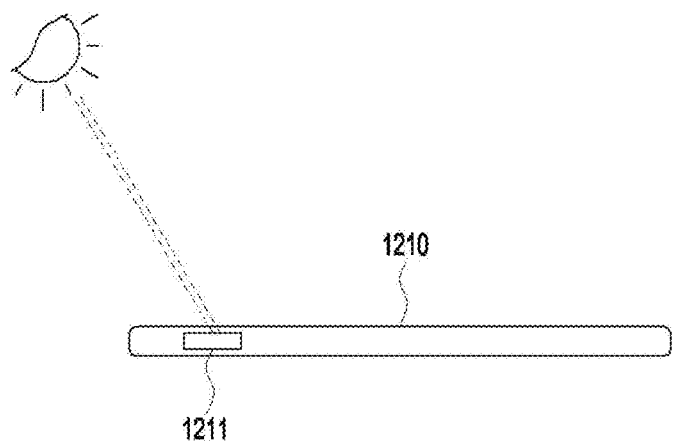
FIGS. 12A to 12C illustrate an electronic device that acquires locations of a light source and a view to apply a shadow effect according to an embodiment of the present disclosure.
Figure 12B:
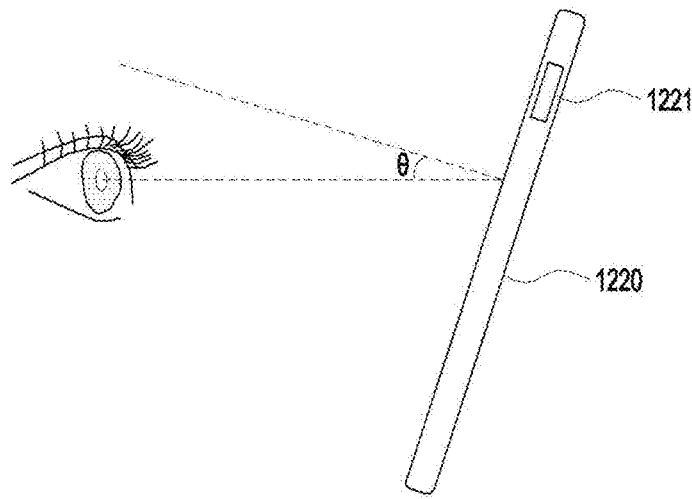
Figure 12C:
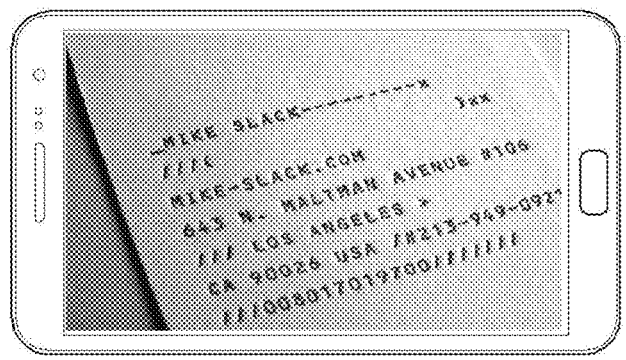

FIGS. 12A to 12C illustrate an electronic device that acquires locations of a light source and a view to apply a shadow effect according to an embodiment of the present disclosure.

Referring to FIG. 12A, an electronic device 1210 may acquire a location of a light source by using an illumination sensor 1211. The electronic device 1210 may apply a shadow effect to a three dimensional object in consideration of the acquired location of the light source. Accordingly, the electronic device 101 may provide a more realistic screen to the user by applying the shadow effect to the image updated according to the acquired location of the light source and displaying the image. Further, according to an embodiment of the present disclosure, when the light source is not sensed, the electronic device 1210 may apply the shadow effect based on a virtual light source to the image and display the image.

Referring to FIG. 12B, an electronic device 1220 may acquire a location of a user's view through a view acquisition module 1221 by using a user's face image and a both-eyes image, acquired through a camera. The electronic device 1220 may calculate an angle (θ) at which the user views the display of the electronic device 1220 based on the acquired location of the view. Accordingly, the electronic device 1220 may apply the shadow effect to the image updated according to the angle (θ) at which the user views the display and display the image.

Further, although not illustrated, the electronic device 101 may apply the shadow effect to the updated image according to a movement of the electronic device 101. For example, the electronic device 101 may sense the movement of the electronic device 101 based on a state where the electronic device 101 is perpendicular to the ground, and apply a preset shadow effect to the updated image according to the sensed movement of the electronic device 101. Further, the electronic device 101 may apply the shadow effect to the updated image based on a virtual light source.

As described above, the updated image, to which the shadow effect is applied, may be displayed on the electronic device 101 as illustrated in FIG. 12C. FIG. 12C illustrates the electronic device 101 that, when height information is controlled and updated such that a height of a position in which the input is acquired is lower than a height of a part in which the input is not acquired, displays the updated image according to the updated height information. Further, as illustrated in FIG. 12C, when a location of the light source is acquired at an upper right portion of the electronic device 101, the electronic device 101 may apply the shadow effect based on the acquired location of the light source to the updated image and display the image on the display. Accordingly, the electronic device 101 may provide a more realistic screen.

Figure 13A:
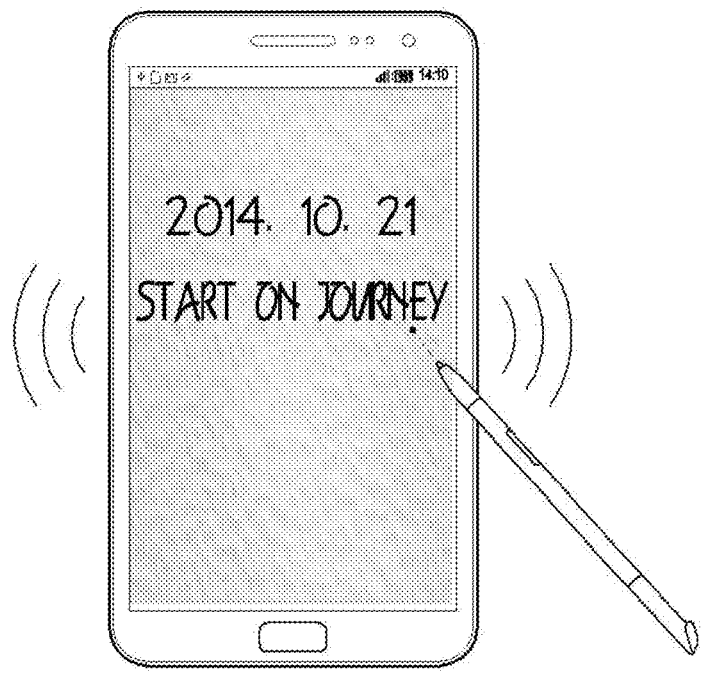
FIGS. 13A and 13B illustrate an electronic device that outputs a preset sound and vibration based on an input according to an embodiment of the present disclosure.
Figure 13B:
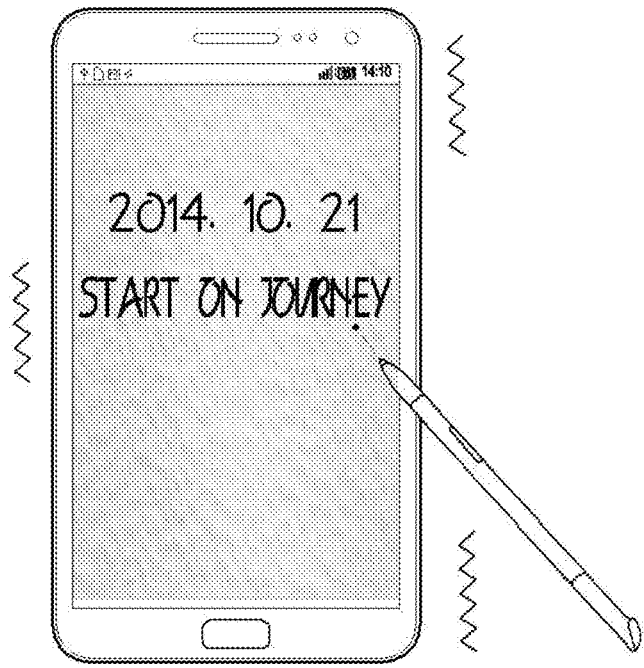

FIGS. 13A and 13B illustrate an electronic device that outputs a preset sound and vibration based on an input according to an embodiment of the present disclosure.

Referring to FIG. 13A, the electronic device 101 may output the preset sound through a speaker based on a preset attribute of the input and texture information. The sound, which is output based on an attribute of the input and the texture information, may be configured in advance. A sound, which is generated when a writing or a drawing is made on paper having the texture through an actual writing tool or a drawing tool corresponding to each attribute of the input, may be acquired, and the acquired sound may be configured as the output sound.

For example, when the attribute of the input corresponds to a pencil and the material corresponds to Tant paper, the electronic device 101 may configure a sound, which is typically generated when writing is made on paper of a Tant paper material by a pencil, as the output sound. Accordingly, when an input having the attribute of the pencil is acquired in a state where an image indicating the Tant paper is displayed, the electronic device 101 may output the configured sound.

Referring to FIG. 13B, the electronic device 101 may generate a vibration based on a difference between additional information corresponding to the image and updated additional information. As the difference becomes larger, a strength of the output vibration may be configured to be stronger.

For example, when the user applies more power to a pen while making an input through the pen, the electronic device 101 may sense a stronger pressure. When the stronger pressure is sensed, the additional information corresponding to the image may be further controlled. Accordingly, the difference between the additional information corresponding to the image and the updated additional information becomes larger and thus the electronic device 101 may output a stronger vibration.

Referring to FIGS. 13A and 13B, the electronic device 101 may provide the sound and the vibration to the user, thereby providing realism as if the user actually takes notes on paper through a pen or the like.

Figure 14:
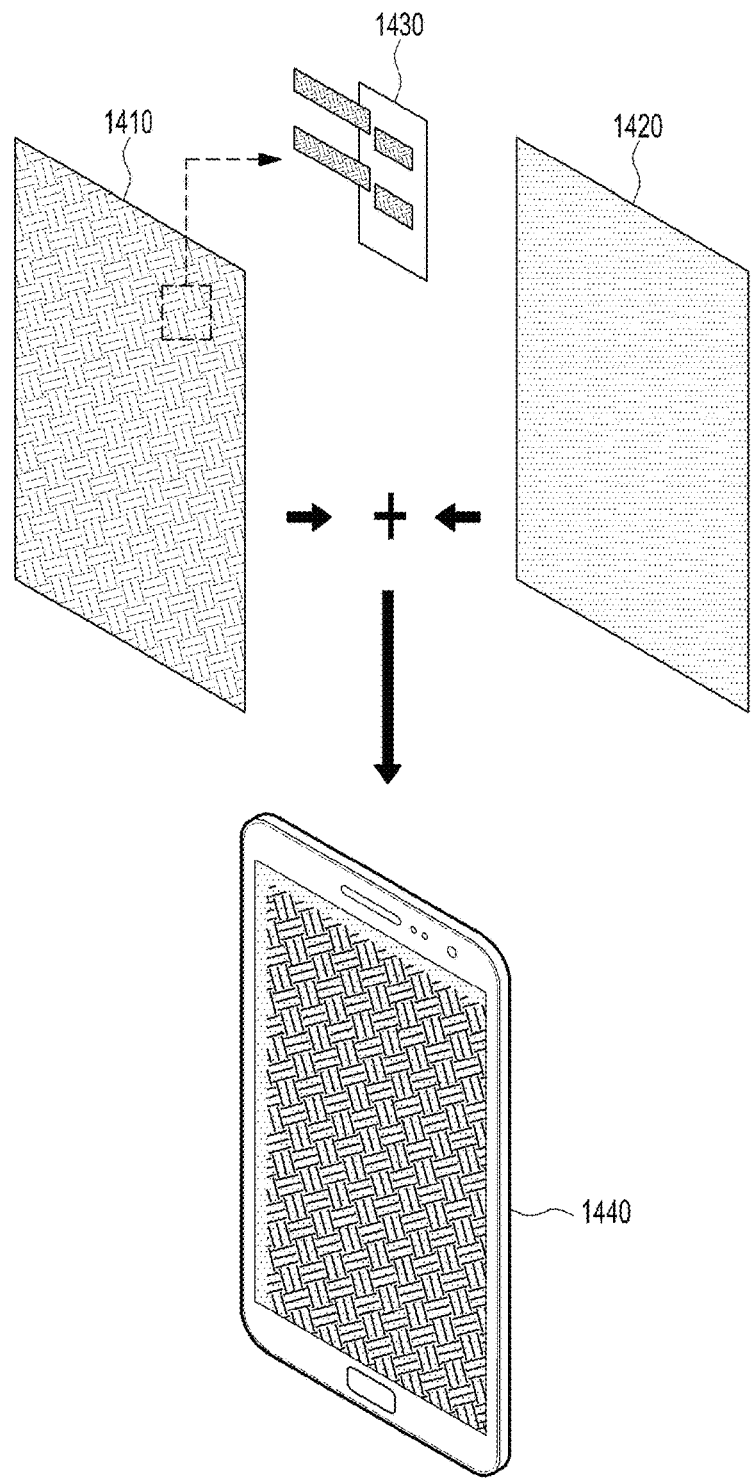
FIG. 14 is a conceptual diagram illustrating a method of inserting additional information into data on an image according to an embodiment of the present disclosure.

FIG. 14 is a conceptual diagram illustrating a method of inserting additional information into data of the image according to an embodiment of the present disclosure.

Referring to FIG. 14, the additional information may be included in each piece of pixel data and may be information on each pixel value for expressing heights or depths of objects included in the image. With respect to the additional information, the corresponding information may be hidden by the image pixel unit through a technique such as a watermark or the standard of the additional information may be embedded in an Exif format. For example, like a 2*2 pixel 1430, the additional information may indicate information on each pixel value for expressing heights or depths of objects included in the image in the unit of groups. To expand the above description to entire pixels, the information may be conceptually expressed like additional information data 1410 and, accordingly, when a two dimensional image indicates paper, a material, texture, and the like of the paper may be displayed on the display. As described above, when each piece of pixel data includes additional information, the electronic device 101 may three dimensionally display the image by displaying the image on the display according to the additional information.

In general, when an image 1420 does not include additional information, the image 1420 is two-dimensionally displayed through the electronic device 101. In contrast, when the image 1420 includes additional information data 1410, an electronic device 1440 may display the image 1420 according to the additional information data 1410 so as to stereoscopically display the image 1420 in three dimensions.

According to an embodiment of the present disclosure, the additional information corresponding to the image may be included in a file header area of the image data or an Exif area. Further, the additional information may be included in a part which is not used in the file header area or the Exif area. The electronic device 101 may display the image on the display according to the additional information included in the file header area or the Exif area.

Figure 15:
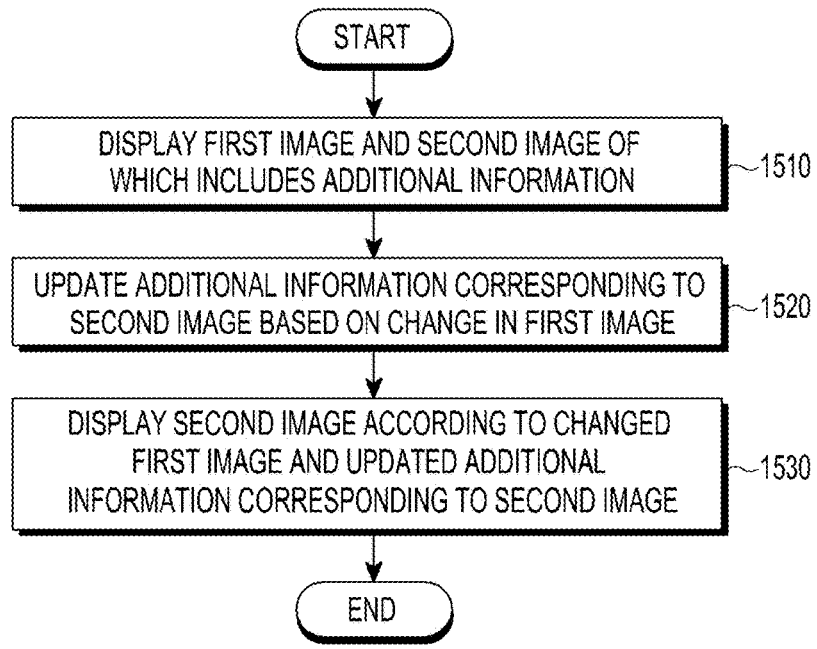
FIG. 15 is a flowchart illustrating an image display method according to an embodiment of the present disclosure.

FIG. 15 is a flowchart illustrating an image display method according to an embodiment of the present disclosure.

Referring to FIG. 15, the electronic device 101 may display a first image and a second image, each of which includes additional information, in operation 1510. The additional information may vary depending on each image. The electronic device 101 may display the first image and the second image on the display according to each piece of the additional information. The first image may be a higher layer than the second image. In this case, the electronic device 101 may overlappingly display the first image on the second image. Further, according to an embodiment of the present disclosure, additional information corresponding to the first image may be configured to be different from additional information corresponding to the second image to reflect a difference between layers.

In operation 1520, the electronic device 101 may update the additional information corresponding to the second image based on a change in the first image. As described above, as the additional information is updated, the image displayed on the display may be changed. Accordingly, in order to reflect the change in the first image in the second image, the electronic device 101 may update the additional information corresponding to the second image.

In operation 1530, the electronic device 101 may display the second image according to the changed first image and the updated additional information corresponding to the second image. As described above, by updating the additional information based on the input, the electronic device 101 may change the second image according to the change in the first image and display the second image on the display.

Figure 16:
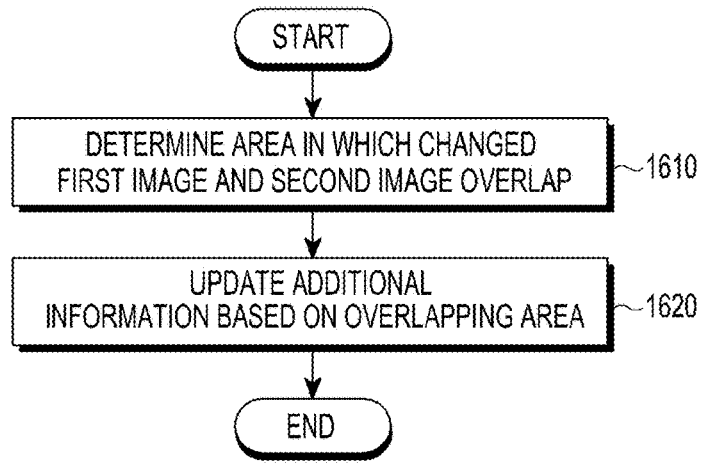
FIG. 16 is a flowchart illustrating an additional information update process according to an embodiment of the present disclosure.

FIG. 16 is a flowchart illustrating an additional information update process according to an embodiment of the present disclosure.

Referring to FIG. 16, the electronic device 101 may determine an area in which the changed first image overlaps the second image in operation 1610. The electronic device 101 may determine the area in which the changed first image overlaps the second image by using data on the changed first image and data on the second image.

In operation 1620, the electronic device 101 may update the additional information corresponding to the second image based on the overlapping area. As described above, since the layer of the second image is lower than the layer of the first two dimensional image, the electronic device 101 may update additional information corresponding to the second two dimensional image according to the change in the first image.

Further, the electronic device 101 may update the additional information corresponding to the second image to additional information controlled according to the additional information corresponding to the first image. A reference for controlling the additional information corresponding to the second image according to the additional information corresponding to the first image may be configured in advance. For example, a reference for controlling height information included in the additional information may be configured in advance such that, as a height indicated by the height information corresponding to the first image is higher, height information corresponding to the second image is further controlled. Further, a reference for controlling depth information included in the additional information may be also configured in the same way as the reference for controlling the height information.

Figure 17A:
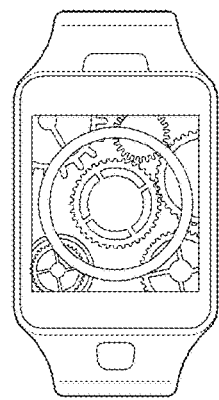
FIGS. 17A to 17C illustrate a display of an electronic device according to an embodiment of the present disclosure.
Figure 17B:
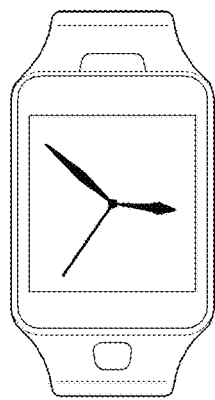
Figure 17C:
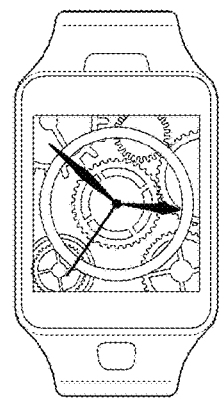

FIGS. 17A to 17C illustrate a display of an electronic device according to an embodiment of the present disclosure.

Referring to FIG. 17A, the electronic device 101 may display a second image on the display according to additional information corresponding to the second image indicating an internal structure of a watch. Accordingly, the electronic device 101 may three-dimensionally display the internal structure of the watch indicated by the second image.

Referring to FIG. 17B, the electronic device 101 may display a first image on the display according to additional information corresponding to the first image indicating hands of a watch. Accordingly, the electronic device 101 may three-dimensionally display the hands of the watch indicated by the first image.

Referring to FIG. 17C, the electronic device 101 may simultaneously display the first image and the second image. Since the first image is a layer higher than the second image, the additional information corresponding to the first image may be configured such that the first image is displayed on a higher layer than the second image. Accordingly, the electronic device 101 may overlappingly display the first image on the second image.

In a process of displaying the first image and the second image, the electronic device 101 may determine an area in which the first image and the second image overlap. The electronic device 101 may update the additional information corresponding to the second image in the overlapping area. Accordingly, unlike a case of FIG. 17A where only the second image is displayed, the electronic device 101 may change the second image according to the first image and display the first image and the changed second image on the display.

Further, the electronic device 101 may continuously determine the area in which the first image and the second image overlap according to the change in the first image indicating the hands of the watch. Accordingly, the electronic device 101 may continuously update the additional information corresponding to the second image according to the change in the first image. Therefore, the electronic device 101 may provide an effect in which the second image is changed and displayed in real time according to the change in the first image.

Figure 18A:
FIGS. 18A to 18C illustrate a display of an electronic device according to an embodiment of the present disclosure.
Figure 18B:
Figure 18C:

FIGS. 18A to 18C illustrate a display of an electronic device according to an embodiment of the present disclosure.

Referring to FIGS. 18A to 18C, a first image may indicate a character image and a second image may indicate paper displayed as a background. Each of the first image and the second image includes additional information and the electronic device 101 may display the first image and the second image on the display according to the additional information. Further, the additional information on the first image indicating the character image may vary depending on each font of the character image.

For example, when thicknesses of characters are uniform, like a font of the character image illustrated in FIG. 18A, the additional information on the first image may be uniformly configured. In contrast, when the thicknesses of the characters are not uniform, like a font of the character image illustrated in FIG. 18B, the additional information on the first image may be configured differentially according to the thickness of each character. Further, strokes of each character may not be uniform and there may be a part in which strokes of each character are not clearly displayed like a font of the character image illustrated in FIG. 18C. In this case, the additional information on the first image may be configured such that the part in which the strokes of each character are not clearly displayed is differentially displayed from the other parts.

As described above, the electronic device 101 may display the first image on the display according to the additional information differently configured according to each font of the character image. The electronic device 101 may provide a three-dimensional effect according to a characteristic of the font of the character image by displaying the generated first image. Further, additional information corresponding to the second image may be differently controlled according to the font of each character image. Accordingly, the second image, which is displayed on the display, may be also differently displayed according to the font of each character image.

Figure 19:
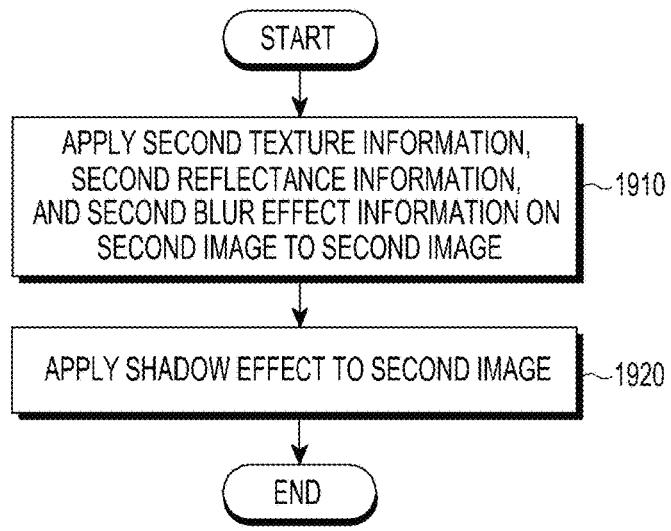
FIG. 19 is a flowchart illustrating a process of displaying a second image according to an embodiment of the present disclosure.

FIG. 19 is a flowchart illustrating a process of displaying a second image according to an embodiment of the present disclosure.

Referring to FIG. 19, the electronic device 101 may apply second texture information, second reflectance information, and second blur effect information to the second image in operation 1910. Accordingly, the electronic device 101 may display the second image, to which at least one piece of the second texture information, the second reflectance information, and the second blur effect information is applied.

The data format of each image may further include texture information on each image, reflectance information preset according to the texture information, and blur effect information preset according to the texture information and an attribute of the input.

For example, the data format of the first image may further include at least one piece of first texture information on the first image, first reflectance information preset according to the first texture information, and first blur effect information preset according to the first texture information and the attribute of the input.

Similarly, the data format of the second image may further include at least one piece of second texture information on the second image, first reflectance information preset according to the second texture information, and second blur effect information preset according to the second texture information and the attribute of the input.

In operation 1920, the electronic device 101 may apply a shadow effect to the second image. The electronic device 101 may apply the shadow effect to the updated image and display the image according to a location of the light source, an angle at which the user views the display or movement of the electronic device 101. Further, when a light source is not sensed, the electronic device 101 may apply the shadow effect based on a virtual light source to the image and display the image. Accordingly, the electronic device 101 may display the updated image further in three dimensions.

Orders of operations 1910 and 1920 may be changed and may be sequentially or simultaneously performed. Further, in the process of displaying the second image, operations 1910 and 1920 may be selectively applied. In addition, although FIG. 19 illustrates the process of displaying the second image, the first image may be also displayed through the same process.

As described above, when displaying the image including the additional information, the electronic device 101 may display the image on the display according to the additional information. Further, according to an embodiment of the present disclosure, the process in which the electronic device 101 displays the image on the display according to the additional information may include a process of generating a three dimensional object by using the additional information and the image and a process of displaying the generated three dimensional object. In addition, the three dimensional object may be generated using a two dimensional image including additional information. Hereinafter, the following description will be made based on a process of generating the three dimensional object by using the two dimensional image including the additional information and displaying the generated three dimensional object.

Figure 20:
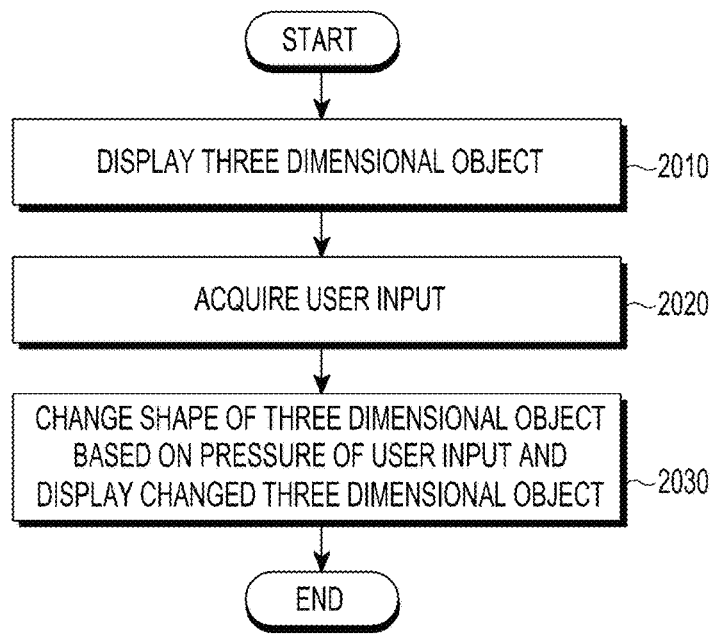
FIG. 20 is a flowchart illustrating an image display method according to an embodiment of the present disclosure.

FIG. 20 is a flowchart illustrating an image display method according to an embodiment of the present disclosure.

Referring to FIG. 20, the electronic device 101 may display a three dimensional object in operation 2010. The three dimensional object may be generated using a two dimensional image including additional information.

In operation 2020, the electronic device 101 may acquire a user input. The input may be a touch input, a pen input, a gesture input, or the like, and an attribute of the input may be preset. When the input corresponds to the touch input or the pen input, the electronic device 101 may sense a pressure of the touch input or the pen input. When the input corresponds to the gesture input, the electronic device 101 may measure a change in a distance between the gesture input and the electronic device.

In operation 2030, the electronic device 101 may change and display a shape of the three-dimensional object based on the pressure of the user input. The electronic device 101 may update additional information corresponding to the two dimensional image according to the pressure of the user input. A reference for controlling the additional information corresponding to the two dimensional image according to the pressure may be configured in advance.

The electronic device 101 may generate the three dimensional object by using the updated additional information. When the additional information is updated, a shape of the generated three dimensional image may be changed. As described above, the electronic device 101 may display the shape-changed three-dimensional object by updating the additional information based on the user input.

According to an embodiment of the present disclosure, when the user input corresponds to the gesture input, the electronic device 101 may change and display the shape of the three dimensional object based on the change in the distance between the measured gesture input and the electronic device. The electronic device 101 may update additional information corresponding to the two dimensional image according to the distance change. A reference for controlling the additional information according to the measured distance change may be configured in advance.

As described above, the electronic device 101 may generate the three dimensional object, which is different according to the measured distance change, by updating the additional information. By displaying the three dimensional object, which is differently generated according to the measured distance change, the electronic device 101 may display the shape-changed three dimensional object based on the input.

Figure 21:
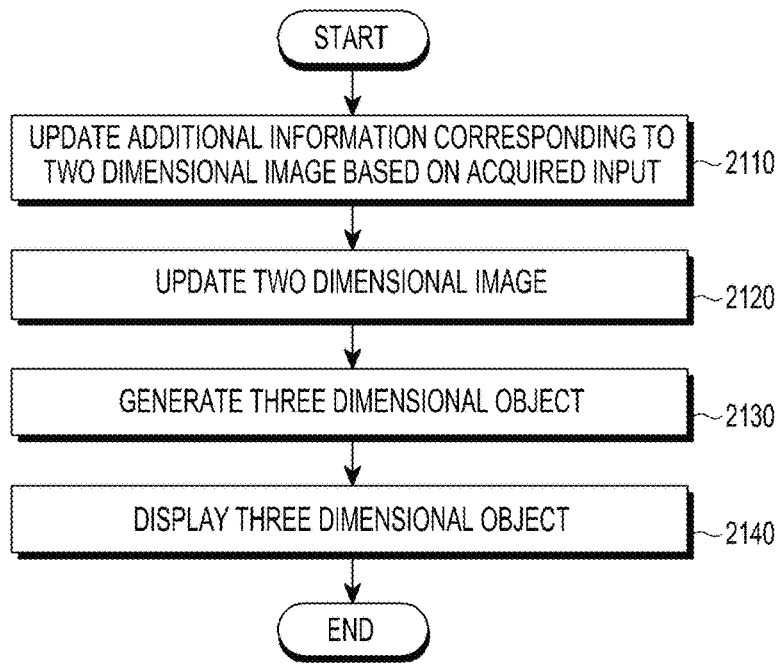
FIG. 21 is a flowchart illustrating an image display method according to an embodiment of the present disclosure.

FIG. 21 is a flowchart illustrating an image display method according to an embodiment of the present disclosure.

Referring to FIG. 21, the electronic device 101 may update additional information corresponding to a two dimensional image based on an acquired input in operation 2110. Since the electronic device 101 may generate a three dimensional object by using the two dimensional image and the additional information corresponding to the two dimensional image, a shape of the three dimensional image may be changed according to the additional information. Accordingly, by updating the additional information according to an acquired input, the electronic device 101 may change the three dimensional image according to the acquired input and display the changed image.

In operation 2120, the electronic device 101 may update the two dimensional image based on the acquired input. Accordingly, the electronic device 101 may reflect the acquired input in the two dimensional image and display the image on the display.

In operation 2130, the electronic device 101 may generate a three dimensional image by using the updated additional information and the updated two dimensional image. Accordingly, the electronic device may generate the three dimensional object of which the shape is changed according to the updated additional information and in which the input is reflected.

In operation 2140, the electronic device 101 may display the generated three dimensional object. Accordingly, the electronic device 101 may provide the user with an effect as if the displayed three dimensional object varies in real time according to the input.

Figure 22:
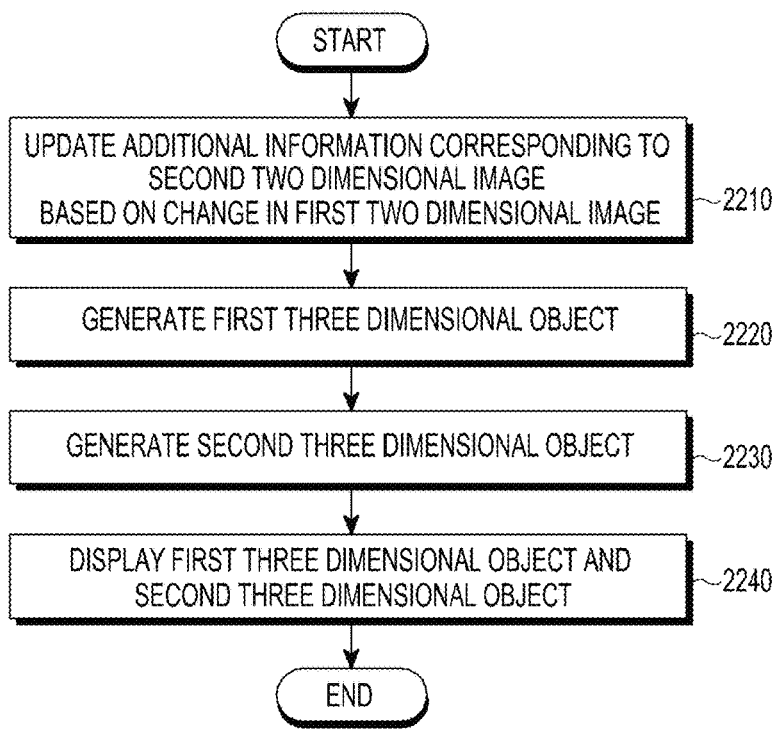
FIG. 22 is a flowchart illustrating an image display method according to an embodiment of the present disclosure.

FIG. 22 is a flowchart illustrating an image display method according to an embodiment of the present disclosure.

Referring to FIG. 22, the electronic device 101 may update additional information corresponding to a second two dimensional image based on a change in a first two dimensional image in operation 2210. A layer of the first two dimensional image may be a higher layer than a layer of the second two dimensional image. Additional information corresponding to the first two dimensional image may be configured to reflect difference between the layers.

Since the electronic device 101 may generate three dimensional objects by using the additional information corresponding to the first two dimensional image and the second two dimensional image, respectively, shapes of the generated three dimensional images may be changed according to the additional information. The electronic device 101 may change the shape of the three dimensional object corresponding to the second two dimensional image according to the change in the first two dimensional image and display the changed three dimensional object by updating the additional information corresponding to the second two dimensional image based on the change in the first two dimensional image.

According to an embodiment of the present disclosure, when the electronic device 101 acquires an input, the electronic device 101 may update the additional information corresponding to the second two dimensional image based on the input. In this case, by updating the additional information according to the acquired input, the electronic device 101 may change the shape of the three dimensional object according to the acquired input and display the changed three dimensional object. As described above, the electronic device 101 may change the shape of the three dimensional object according to at least one of the acquired input and the change in the first two dimensional image and display the changed three dimensional object.

In operation 2220, the electronic device 101 may generate a first three dimensional object by using the first two dimensional image and the additional information corresponding to the first two dimensional image. Since the first two dimensional image also includes the additional information, the electronic device 101 may generate the first three dimensional object. Further, the electronic device 101 may reflect the change in the first two dimensional image to generate the first three dimensional object, thereby provide an effect as if the first three dimensional object varies.

According to an embodiment of the present disclosure, when the electronic device 101 acquires an input, the electronic device 101 may update the additional information corresponding to the first two dimensional image based on the input. In this case, by updating the additional information according to the acquired input, the electronic device 101 may change the shape of the three dimensional object according to the acquired input and display the changed three dimensional object.

In operation 2230, the electronic device 101 may generate a second three dimensional object by using the second two dimensional image and the updated additional information corresponding to the second two dimensional image. Accordingly, the electronic device 101 may generate the shape-changed second three dimensional object according to the change in the first two dimensional image.

In operation 2240, the electronic device 101 may display the first three dimensional object and the second three dimensional object. The electronic device 101 may display the first three dimensional object on a higher layer than the second three dimensional object. Accordingly, the electronic device 101 may provide an effect as if the second three dimensional object varies in real time according to the change in the first three dimensional object.

According to various embodiments of the present disclosure, a method of displaying an image by an electronic device may include displaying an image including additional information, acquiring a user input made on the image, updating the additional information corresponding to the image and the image based on the input, and displaying the updated image according to the updated additional information.

According to various embodiments of the present disclosure, the additional information may include at least one piece of depth information and height information.

According to various embodiments of the present disclosure, the displaying of the updated image may include sensing pressure of the input, and updating the additional information corresponding to the image to additional information controlled according to the sensed pressure based on a location of the input.

According to various embodiments of the present disclosure, the displaying of the updated image may include measuring a change in a distance between the input and the electronic device, and updating the additional information corresponding to the image to additional information controlled according to the change in the distance based on a location of the input.

According to various embodiments of the present disclosure, the additional information may be included in a data format of the image.

According to various embodiments of the present disclosure, the data format of the image may further include at least one piece of texture information on the image, reflectance information preset according to the texture information, and blur effect information preset according to the texture information and an attribute of the input.

According to various embodiments of the present disclosure, the displaying of the updated image may include applying at least one piece of the texture information, the reflectance information, and the blur effect information to the updated image.

According to various embodiments of the present disclosure, the displaying of the updated image may include applying at least one of a shadow effect based on a location of a light source acquired through an illumination sensor, a shadow effect based on a location of a view acquired through a camera, a shadow effect according to a movement of the electronic device, and a shadow effect based on a virtual light source to the updated image.

According to various embodiments of the present disclosure, the method may further include outputting a vibration based on a difference between the additional information corresponding to the image and the updated additional information.

According to various embodiments of the present disclosure, the method may further include outputting a sound preset based on the attribute of the input and the texture information.

According to various embodiments of the present disclosure, an electronic device may include a display configured to display an image including additional information, and a controller configured to acquire a user input made on the image, update the additional information corresponding to the image and the image based on the input, and control the display to display the updated image according to the updated additional information.

According to various embodiments of the present disclosure, the additional information may include at least one piece of depth information and height information.

According to various embodiments of the present disclosure, the controller may be further configured to sense a pressure of the input and update the additional information corresponding to the image to additional information controlled according to the sensed pressure based on a location of the input.

According to various embodiments of the present disclosure, the controller may be further configured to measure a change in a distance between the input and the electronic device and update the additional information corresponding to the image to additional information controlled according to the change in the distance based on a location of the input.

According to various embodiments of the present disclosure, the additional information may be included in a data format of the image.

According to various embodiments of the present disclosure, the data format of the image may further include at least one piece of texture information on the image, reflectance information preset according to the texture information, and blur effect information preset according to the texture information and an attribute of the input.

According to various embodiments of the present disclosure, the controller may be further configured to apply at least one piece of the texture information, the reflectance information, and the blur effect information to the updated image.

According to various embodiments of the present disclosure, the controller may be further configured to apply at least one of a shadow effect based on a location of a light source acquired through an illumination sensor, a shadow effect based on a location of a view acquired through a camera, a shadow effect according to a movement of the electronic device, and a shadow effect based on a virtual light source to the updated image.

According to various embodiments of the present disclosure, the controller may be further configured to output a vibration based on a difference between the additional information corresponding to the image and the updated additional information.

According to various embodiments of the present disclosure, the controller may be further configured to output a sound preset based on the attribute of the input and the texture information.

According to various embodiments of the present disclosure, a method of displaying an image by an electronic device may include displaying a first image and a second image, each of which includes additional information, a layer of the first image being higher than a layer of the second image, updating additional information corresponding to the second image based on a change in the first image, and displaying the second image according to the changed first image and the updated additional information corresponding to the second image.

According to various embodiments of the present disclosure, the additional information may include at least one piece of depth information and height information.

According to various embodiments of the present disclosure, the displaying of the changed first image and the second image may include determining an area in which the changed first image and the second image overlap, and updating additional information corresponding to the second image based on the overlapping area.

According to various embodiments of the present disclosure, the updating of the additional information corresponding to the second image may include updating the additional information corresponding to the second image to additional information controlled according to additional information corresponding to the first image.

According to various embodiments of the present disclosure, the additional information corresponding to the first image may be included in a data format of the first image, and the additional information corresponding to the second image may be included in a data format of the second image.

According to various embodiments of the present disclosure, the data format of the first image may include at least one piece of first texture information on the first image, first reflectance information preset according to the first texture information, and first blur effect information preset according to the first texture information and an attribute of an input. The data format of the second image may include at least one piece of second texture information on the second image, second reflectance information preset according to the second texture information, and second blur effect information preset according to the second texture information and the attribute of the input.

According to various embodiments of the present disclosure, the displaying of the changed first image and the second image may include applying at least one piece of the first texture information, the first reflectance information, and the first blur effect information to the changed first image, and applying at least one piece of the second texture information, the second reflectance information, and the second blur effect information to the second image.

According to various embodiments of the present disclosure, an electronic device may include a display configured to display a first image and a second image, each of which includes additional information, a layer of the first image being higher than a layer of the second image, and a controller configured to update additional information corresponding to the second image based on a change in the first image, and display the second image on the display according to the changed first image and the updated additional information corresponding to the second image.

According to various embodiments of the present disclosure, the additional information may include at least one piece of depth information and height information.

According to various embodiments of the present disclosure, the controller may be further configured to determine an area in which the changed first image and the second image overlap and update additional information corresponding to the second image based on the overlapping area.

According to various embodiments of the present disclosure, the controller may be further configured to update the additional information corresponding to the second image to additional information controlled according to additional information corresponding to the first image.

According to various embodiments of the present disclosure, the additional information corresponding to the first image may be included in a data format of the first image, and the additional information corresponding to the second image may be included in a data format of the second image.

According to various embodiments of the present disclosure, the data format of the first image may include at least one piece of first texture information on the first image, first reflectance information preset according to the first texture information, and first blur effect information preset according to the first texture information and an attribute of an input. The data format of the second image may include at least one piece of second texture information on the second image, second reflectance information preset according to the second texture information, and second blur effect information preset according to the second texture information and the attribute of the input.

According to various embodiments of the present disclosure, the controller may be further configured to apply at least one piece of the first texture information, the first reflectance information, and the first blur effect information to the changed first image and applies at least one piece of the second texture information, the second reflectance information, and the second blur effect information to the second image.

According to various embodiments of the present disclosure, a method of displaying an image by an electronic device may include displaying a three dimensional object, acquiring a user input, and changing a shape of the three dimensional object based on a pressure of the acquired user input and displaying the changed three dimensional object.

According to various embodiments of the present disclosure, an electronic device may include a display configured to display a three dimensional object, and a controller configured to acquire a user input, change a shape of the three dimensional object based on a pressure of the acquired user input, and display the changed three dimensional object on the display.

According to various embodiments of the present disclosure, a method of displaying an image by an electronic device may include updating additional information corresponding to a two dimensional image based on an acquired input, updating the two dimensional image based on the input, generating a three dimensional object by using the updated additional information and the updated two dimensional image, and displaying the three dimensional object.

According to various embodiments of the present disclosure, an electronic device may include a display and a controller configured to update additional information corresponding to a two dimensional image and the two dimensional image based on an acquired input, generate a three dimensional object by using the updated additional information and the updated two dimensional image, and display the three dimensional object on the display.

According to various embodiments of the present disclosure, a method of displaying an image by an electronic device may include updating additional information corresponding to a second two dimensional image based on a change in a first two dimensional image, a layer of the first two dimensional image being higher than a layer of the second two dimensional image, generating a first three dimensional object by using additional information corresponding to the first two dimensional image and the second two dimensional image, generating a second three dimensional object by using the second two dimensional image and the updated additional information, and displaying the first three dimensional object and the second three dimensional object.

According to various embodiments of the present disclosure, an electronic device may include a display; and a controller configured to update additional information corresponding to a second two dimensional image based on a change in a first two dimensional image, a layer of the first two dimensional image being higher than a layer of the second two dimensional image, generate a first three dimensional object by using additional information corresponding to the first two dimensional image and the second two dimensional image, generate a second three dimensional object by using the second two dimensional image and the updated additional information, and display the first three dimensional object and the second three dimensional object on a touch screen.

Figure 23:
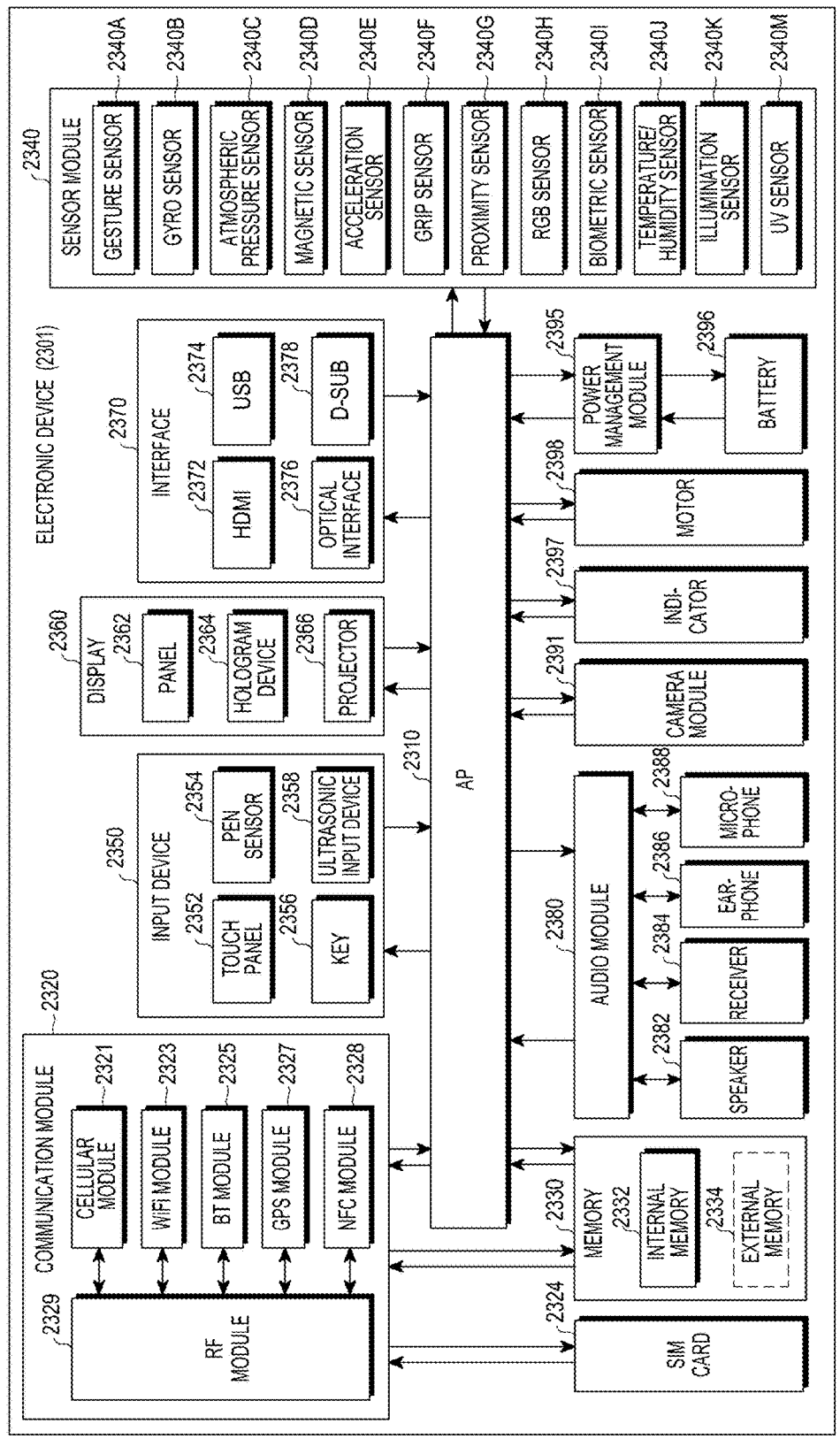
FIG. 23 is a block diagram of an electronic device according to various embodiments of the present disclosure.

FIG. 23 is a block diagram of an electronic device according to various embodiments of the present disclosure.

Referring to FIG. 23, an electronic device 2301 may include, for example, all or some of the electronic device 101 illustrated in FIG. 1. For example, the electronic device 101 illustrated in FIG. 1 may include all or some of the electronic device 101 illustrated in FIG. 23. The electronic device 2301 may include at least one AP 2310, a communication module 2320, a subscriber identification module (SIM) card 2324, a memory 2330, a sensor module 2340, an input device 2350, a display 2360, an interface 2370, an audio module 2380, a camera module 2391, a power management module 2395, a battery 2396, an indicator 2397, and a motor 2398.

The AP 2310 may control a plurality of hardware or software elements connected thereto by driving an operating system or an application program and perform a variety of data processing and calculations. The AP 2310 may be implemented by, for example, a system on chip (SoC). According to an embodiment of the present disclosure, the AP 2310 may further include a graphical processing unit (GPU) and/or an image signal processor. The AP 2310 may also include at least some (for example, a cellular module 2321) of the elements illustrated in FIG. 2. The AP 2310 may load instructions or data, received from at least one other element (for example, a non-volatile memory), in a volatile memory to process the loaded instructions or data, and may store various types of data in a non-volatile memory.

The communication module 2320 may have a configuration equal or similar to the communication interface 170 of FIG. 1. The communication module 2320 may include, for example, the cellular module 2321, a Wi-Fi module 2323, a BT module 2325, a GPS module 2327, an NFC module 2328, and a radio frequency (RF) module 2329.

The cellular module 2321 may provide a voice call, video call, text message services, or Internet services through, for example, a communication network. According to an embodiment of the present disclosure, the cellular module 2321 may distinguish between and authenticate the electronic device 2301 within a communication network using a subscriber identification module (for example, the SIM card 2324). According to an embodiment of the present disclosure, the cellular module 2321 may perform at least some of the functions which may be provided by the AP 2310. According to an embodiment of the present disclosure, the cellular module 2321 may include a communication processor (CP).

The Wi-Fi module 2323, the BT module 2325, the GPS module 2327, and the NFC module 2328 may include, for example, a processor for processing data transmitted/received through the corresponding module. According to some embodiments, at least some (two or more) of the cellular module 2321, the Wi-Fi module 2323, the BT module 2325, the GPS module 2327, and the NFC module 2328 may be included in one integrated chip (IC) or IC package.

The RF module 2329 may transmit/receive, for example, a communication signal (for example, an RF signal). The RF module 2329 may include, for example, a transceiver, a power amplifier module (PAM), a frequency filter, a low noise amplifier (LNA) or an antenna. According to another embodiment of the present disclosure, at least one of the cellular module 2321, the Wi-Fi module 2323, the BT module 2325, the GPS module 2327, and the NFC module 2328 may transmit/receive an RF signal through a separate RF module.

The SIM card 2324 may include a card including a subscriber identification module and/or an embedded SIM, and contain unique identification information (for example, an integrated circuit card identifier (ICCID)) or subscriber information (for example, an international mobile subscriber identity (IMSI)).

The memory 2330 (for example, the memory 130) may include, for example, an internal memory 2332 or an external memory 2334. The internal memory 2332 may include at least one of, for example, a volatile memory (for example, a dynamic random access memory (DRAM), a Static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard drive, or a solid state drive (SSD).

The external memory 2334 may further include a flash drive, for example, a compact flash (CF), a secure digital (SD), a micro secure digital (Micro-SD), a mini secure digital (Mini-SD), an extreme digital (xD), a memory stick, or the like. The external memory 2334 may be functionally and/or physically connected to the electronic device 2301 through various interfaces.

The sensor module 2340 may measure, for example, a physical quantity or detect an operation state of the electronic device 2301, and may convert the measured or detected information to an electrical signal. The sensor module 2340 may include, for example, at least one of a gesture sensor 2340A, a gyro sensor 2340B, an atmospheric pressure sensor 2340C, a magnetic sensor 2340D, an acceleration sensor 2340E, a grip sensor 2340F, a proximity sensor 2340G, a color sensor 2340H (for example, red, green, and blue (RGB) sensor), a biometric sensor 2340I, a temperature/humidity sensor 2340J, an illumination sensor 2340K, and an ultra violet (UV) sensor 2340M. Additionally or alternatively, the sensor module 2340 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2340 may further include a control circuit for controlling at least one sensor included therein. According to various embodiments of the present disclosure, the electronic device 2301 may further include a processor configured to control the sensor module 2340 as a part of or separately from the AP 2310, and may control the sensor module 2340 while the AP 2310 is in a sleep state.

The input device 2350 may include, for example, a touch panel 2352, a (digital) pen sensor 2354, a key 2356, or an ultrasonic input device 2358. The touch panel 2352 may use at least one of, for example, a capacitive type, a resistive type, an infrared type, and an ultrasonic type. The touch panel 2352 may further include a control circuit. The touch panel 2352 may further include a tactile layer, and provide a tactile reaction to a user.

The (digital) pen sensor 2354 may include, for example, a recognition sheet which is a part of the touch panel or a separate recognition sheet. The key 2356 may include, for example, a physical button, an optical key or a keypad. The ultrasonic input unit 2358 may input data through an input means that generates an ultrasonic signal, and the electronic device 2301 identify data by detecting a sound wave with a microphone (for example, a microphone 2388).

The display 2360 (for example, the display 160) may include a panel 2362, a hologram device 2364 or a projector 2366. The panel 2362 may include an element equal or similar to the display 160 of FIG. 1. The panel 2362 may be embodied to be, for example, flexible, transparent, or wearable. The panel 2362 may also be configured to be integrated with the touch panel 2352 as a single module. The hologram device 2364 may show a stereoscopic image in the air by using interference of light. The projector 2366 may project light onto a screen to display an image. For example, the screen may be located inside or outside the electronic device 2301. According to an embodiment of the present disclosure, the display 2360 may further include a control circuit for controlling the panel 2362, the hologram device 2364, or the projector 2366.

The interface 2370 may include, for example, a HDMI 2372, a USB 2374, an optical interface 2376, or a D-sub-miniature (D-sub) 2378. The interface 2370 may be included in, for example, the communication interface 170 illustrated in FIG. 1. Additionally or alternatively, the interface 2370 may include, for example, a mobile high-definition link (MHL) interface, a secure digital (SD) card/multi-media card (MMC) interface, or an infrared data association (IrDA) standard interface.

The audio module 2380 may bilaterally convert, for example, a sound and an electrical signal. At least some elements of the audio module 2380 may be included in, for example, the input/output interface 140 illustrated in FIG. 1. The audio module 2380 may process sound information input or output through, for example, a speaker 2382, a receiver 2384, earphones 2386, the microphone 2388, or the like.

The camera module 2391 is a device which may photograph a still image and a dynamic image. According to an embodiment of the present disclosure, the camera module 291 may include one or more image sensors (for example, a front sensor or a back sensor), a lens, an image signal processor (ISP) or a flash (for example, LED or xenon lamp).

The power management module 2395 may manage, for example, power of the electronic device 2301. According to an embodiment of the present disclosure, the power management module 2395 may include a power management integrated circuit (PMIC), a charger IC) or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, and the like) for wireless charging may be further included. The battery gauge 2396 may measure, for example, the remaining amount of battery, a charging voltage and current, or temperature. The battery 2396 may include, for example, a rechargeable battery and/or a solar battery.

The indicator 2397 may indicate a particular status of the electronic device 2301 or a part thereof (for example, the AP 2310), for example, a booting status, a message status, a charging status, or the like. The motor 2398 may convert an electrical signal into mechanical vibrations, and may generate a vibration or haptic effect. Although not illustrated, the electronic device 2301 may include a processing device (for example, a GPU) for supporting mobile TV. The processing device for supporting mobile TV may process media data according to a standard of digital multimedia broadcasting (DMB), digital video broadcasting (DVB), media flow or the like.

Each of the components of the electronic device according to the present disclosure may be implemented by one or more components and the name of the corresponding component may vary depending on a type of the electronic device. In various embodiments of the present disclosure, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments of the present disclosure, a storage medium having commands stored therein is provided. The commands are configured to allow one or more processors to perform one or more processes when being executed by the one or more processors. The processes may include a process for displaying an image including additional information, a process for acquiring a user input made on the image, and a process for updating the additional information corresponding to the image and the image and displaying the updated image according to the updated additional information.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display configured to display an image including additional information; and
   at least one processor configured to control to:
   receive a user input for displaying at least one object on the image,
   update, according to the user input, the additional information corresponding to the image, and the image according to the updated additional information, and
   display, on the display, the updated image including the at least one object,
   wherein the additional information includes depth information and height information, and
   wherein the depth information includes information on a plurality of pixel values for expressing a depth of the at least one object included in the updated image, and the height information includes information on a plurality of pixel values for expressing a height of the at least one object included in the updated image.

2. The electronic device of claim 1, wherein the at least one processor is further configured to control to:
   sense a pressure of the input, and
   update the additional information corresponding to the image to additional information controlled according to the sensed pressure based on a location of the input.

3. The electronic device of claim 1, wherein the at least one processor is further configured to control to:
   measure a change in a distance between the input and the electronic device, and
   update the additional information corresponding to the image to additional information controlled according to the change in the distance based on a location of the input.

4. The electronic device of claim 1, wherein the additional information is included in a data format of the image.

5. The electronic device of claim 4, wherein the data format of the image further includes at least one piece of texture information on the image, reflectance information preset according to the texture information, or blur effect information preset according to the texture information and an attribute of the input.

6. The electronic device of claim 5, wherein the at least one processor is further configured to control to apply at least one piece of the texture information, the reflectance information, or the blur effect information to the updated image.

7. The electronic device of claim 1, wherein the at least one processor is further configured to control to apply at least one of a shadow effect based on a location of a light source acquired through an illumination sensor, a shadow effect based on a location of a view acquired through a camera, a shadow effect according to a movement of the electronic device, or a shadow effect based on a virtual light source to the updated image.

8. The electronic device of claim 1, wherein the at least one processor is further configured to control to output a vibration based on a difference between the additional information corresponding to the image and the updated additional information.

9. The electronic device of claim 5, wherein the at least one processor is further configured to control to output a sound preset based on the attribute of the input and the texture information.

10. A method of displaying an image by an electronic device, the method comprising:
    displaying an image including additional information;
    receiving a user input for displaying at least one object on the image;

updating, according to the user input, the additional information corresponding to the image, and the image according to the updated additional information; and displaying the updated image including the at least one object, wherein the additional information includes depth information and height information, and wherein the depth information includes information on a plurality of pixel values for expressing a depth of the at least one object included in the updated image, and the height information includes information on a plurality of pixel values for expressing a height of the at least one object included in the updated image.

11. The method of claim 10, wherein the displaying of the updated image comprises:

sensing a pressure of the input; and updating the additional information corresponding to the image to additional information controlled according to the sensed pressure based on a location of the input.

12. An electronic device comprising:

a display configured to display a first image and a second image, each of which includes additional information, a layer of the first image being higher than a layer of the second image; and at least one processor configured to control to:

update additional information corresponding to the second image based on a change in the first image, and display the second image on the display according to the changed first image and the updated additional information corresponding to the second image, wherein the additional information includes depth information and height information, and wherein the depth information includes information on a plurality of pixel values for expressing a depth of the first image and the second image, and the height information includes a plurality of pixel values for expressing a height of the first image and the second image.

13. The electronic device of claim 12, wherein the at least one processor is further configured to control to:

determine an area in which the changed first image and the second image overlap, and update additional information corresponding to the second image based on the overlapping area.

14. The electronic device of claim 13, wherein the at least one processor is further configured to control to update the additional information corresponding to the second image to additional information controlled according to additional information corresponding to the first image.

15. The electronic device of claim 12, wherein the additional information corresponding to the first image is included in a data format of the first image, and wherein the additional information corresponding to the second image is included in a data format of the second image.

16. The electronic device of claim 15, wherein the data format of the first image includes at least one piece of first texture information on the first image, first reflectance information preset according to the first texture information, or first blur effect information preset according to the first texture information and an attribute of an input, and wherein the data format of the second image includes at least one piece of second texture information on the second image, second reflectance information preset according to the second texture information, or second blur effect information preset according to the second texture information and the attribute of the input.

17. The electronic device of claim 16, wherein the at least one processor is further configured to control to:

apply at least one piece of the first texture information, the first reflectance information, or the first blur effect information to the changed first image, and apply at least one piece of the second texture information, the second reflectance information, or the second blur effect information to the second image.

* * * * *